US008388435B2

(12) United States Patent
Anderson et al.

(10) Patent No.: US 8,388,435 B2
(45) Date of Patent: Mar. 5, 2013

(54) GAMING SYSTEM HAVING MULTIPLE WAGERING GAMES WITH SHARED FEATURES

(75) Inventors: Peter R. Anderson, Glenview, IL (US); Allon G. Englman, Chicago, IL (US); Benjamin T. Gomez, Chicago, IL (US); Joel R. Jaffe, Glenview, IL (US); Daniel P. Louie, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 35 days.

(21) Appl. No.: 12/995,255

(22) PCT Filed: May 28, 2009

(86) PCT No.: PCT/US2009/045396

§ 371 (c)(1),
(2), (4) Date: Nov. 30, 2010

(87) PCT Pub. No.: WO2009/148908

PCT Pub. Date: Dec. 10, 2009

(65) Prior Publication Data

US 2011/0105218 A1 May 5, 2011

Related U.S. Application Data

(60) Provisional application No. 61/130,869, filed on Jun. 3, 2008.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................ 463/20; 436/16; 436/19; 436/25; 436/26; 436/27; 436/28; 436/29; 436/30; 436/31; 436/32; 436/33; 436/34; 436/35; 273/143

(58) Field of Classification Search .................... 463/16, 463/19, 20, 25–35; 273/143
See application file for complete search history.

(56) References Cited

U.S. PATENT DOCUMENTS

| | | | | |
|---|---|---|---|---|
| 5,531,448 | A | 7/1996 | Moody | 273/292 |
| 5,732,950 | A | 3/1998 | Moody | 273/292 |
| 5,823,873 | A | 10/1998 | Moody | |
| 5,954,335 | A | 9/1999 | Moody | 273/292 |
| 5,976,016 | A | 11/1999 | Moody et al. | 463/13 |
| 5,997,401 | A | 12/1999 | Crawford | |
| 6,007,066 | A | 12/1999 | Moody | 273/292 |

(Continued)

OTHER PUBLICATIONS

Written Opinion of the International Searching Authority for PCT/US2009/045396 completed Sep. 17, 2009 (9 pages).

(Continued)

*Primary Examiner* — Omkar Deodhar
*Assistant Examiner* — Adetokunbo Torimiro
(74) *Attorney, Agent, or Firm* — Nixon Peabody LLP

(57) ABSTRACT

A method of playing a wagering game comprises receiving a wager, and generating a randomly selected first outcome of a first wagering game, the first outcome comprising a first plurality of symbols arranged in a first matrix. The method further comprises generating a randomly selected second outcome of a second wagering game, the second outcome comprising a second plurality of symbols arranged in a second matrix, and simultaneously displaying the first outcome and the second outcome on at least one display. The method further comprises detecting an occurrence of a triggering event, in response to the triggering event, copying a first special symbol occurring in the first outcome into the second outcome to yield a modified second outcome, and evaluating the first outcome and the modified second outcome for winning combinations of symbols.

25 Claims, 25 Drawing Sheets

U.S. PATENT DOCUMENTS

| | | | | |
|---|---|---|---|---|
| 6,098,985 | A | 8/2000 | Moody | 273/292 |
| 6,120,378 | A | 9/2000 | Moody et al. | 463/20 |
| 6,159,095 | A * | 12/2000 | Frohm et al. | 463/19 |
| 6,203,428 | B1 | 3/2001 | Giobi et al. | |
| 6,270,412 | B1 | 8/2001 | Crawford et al. | |
| 6,311,978 | B1 | 11/2001 | Moody | 273/292 |
| 6,315,291 | B1 | 11/2001 | Moody | 273/139 |
| 6,364,313 | B1 | 4/2002 | Moody | 273/138.1 |
| 6,419,578 | B1 | 7/2002 | Moody et al. | 463/13 |
| 6,517,074 | B1 | 2/2003 | Moody et al. | 273/292 |
| 6,561,898 | B2 | 5/2003 | Moody | 463/13 |
| 6,568,680 | B1 | 5/2003 | Moody et al. | 273/292 |
| 6,652,377 | B1 | 11/2003 | Moody | 463/13 |
| 6,652,378 | B2 | 11/2003 | Cannon et al. | |
| 6,656,040 | B1 | 12/2003 | Brosnan et al. | |
| 6,672,959 | B2 | 1/2004 | Moody et al. | 463/13 |
| 6,755,738 | B2 | 6/2004 | Glasson et al. | |
| 6,832,957 | B2 | 12/2004 | Falconer | |
| 6,860,810 | B2 | 3/2005 | Cannon et al. | |
| 6,921,334 | B1 | 7/2005 | Bennett | |
| 6,955,356 | B2 | 10/2005 | Moody | 273/292 |
| 6,964,418 | B2 | 11/2005 | Moody | 273/292 |
| 7,137,628 | B2 | 11/2006 | Moody | 273/292 |
| 7,156,397 | B2 | 1/2007 | Moody et al. | 273/292 |
| 7,156,735 | B2 | 1/2007 | Brosnan et al. | |
| 7,222,857 | B2 | 5/2007 | Moody | 273/292 |
| 7,222,858 | B2 | 5/2007 | Moody | 273/292 |
| 7,404,762 | B2 | 7/2008 | Moody | 463/13 |
| 7,431,644 | B2 | 10/2008 | Moody | 463/13 |
| 7,527,557 | B2 | 5/2009 | Jackson | 463/20 |
| 8,105,145 | B2 * | 1/2012 | Jaffe | 463/16 |
| 2005/0233794 | A1 * | 10/2005 | Cannon et al. | 463/16 |

OTHER PUBLICATIONS

International Search Report for PCt/US2009/045396 mailed Sep. 24, 2009 (5 pages).

* cited by examiner

FIG. 1B
200
0
10
10
100
PAY TABLE
HELP
PAY TABLE
SELECT LINES
BET PER LINE
SPIN REELS
MAX BET SPIN

GAMING SYSTEM HAVING MULTIPLE WAGERING GAMES WITH SHARED FEATURES

CLAIM OF PRIORITY AND CROSS-REFERENCE TO RELATED APPLICATIONS

This application is a U.S. National Phase of International Application No. PCT/US2009/045396, filed on May 28, 2009, which claims the benefit of and priority to U.S. Provisional patent application No. 61/130,869, filed on Jun. 3, 2008, both of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming systems, and methods for playing wagering games, and more particularly, to gaming systems having multiple wagering games having shared features.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

To increase appeal, some gaming terminals may display a plurality of wagering games to offer greater opportunities for winning awards. One way to further excitement and entertainment value of such gaming terminals is to provide a plurality of wagering games which share one or more special features.

SUMMARY OF THE INVENTION

According to one aspect of the present invention, a method of playing a wagering game comprises receiving a wager, and generating a randomly selected first outcome of a first wagering game, the first outcome comprising a first plurality of symbols arranged in a first matrix. The method further comprises generating a randomly selected second outcome of a second wagering game, the second outcome comprising a second plurality of symbols arranged in a second matrix, and simultaneously displaying the first outcome and the second outcome on at least one display. The method further comprises detecting an occurrence of a triggering event, in response to the triggering event, copying a first special symbol occurring in the first outcome into the second outcome to yield a modified second outcome, and evaluating the first outcome and the modified second outcome for winning combinations of symbols.

According to another aspect of the invention, a gaming system comprises a wager input device, at least one gaming terminal including at least one display, and at least one controller operative to (i) generate a randomly selected first outcome of a first wagering game, the first outcome comprising a first plurality of symbols arranged in a first matrix, (ii) generate a randomly selected second outcome of a second wagering game, the second outcome comprising a second plurality of symbols arranged in a second matrix, (iii) cause the at least one display to simultaneously display the first outcome and the second outcome, (iv) detect an occurrence of a triggering event, (v) in response to the triggering event, copy a first special symbol occurring in the first outcome into the second outcome to yield a modified second outcome, and (vi) evaluate the first outcome and the modified second outcome for winning combinations of symbols.

According to yet another aspect of the invention, a method of playing a wagering game comprises receiving a wager and generating a plurality of randomly selected outcomes in a plurality of wagering games, each of the plurality of wagering games comprising a plurality of symbols arranged in a matrix. The method further comprises simultaneously displaying the plurality of randomly selected outcomes on at least one display, detecting an occurrence of a triggering event and in response to the triggering event, copying a first special symbol occurring in a first one of the matrices into each of a remainder of the plurality of matrices, wherein the first special symbol replaces one or more standard symbols occurring in the remainder of the plurality of matrices. The method includes evaluating the first and second outcomes for winning combinations of symbols.

According to yet another aspect of the invention, a method of playing a wagering game comprises receiving a wager and generating a randomly selected first outcome of a first wagering game, the first outcome comprising a first plurality of symbols arranged in a first matrix. The method further comprises displaying a plurality of copies of the first matrix on at least one display, detecting the occurrence of a re-spin triggering event, and in response to the detection, revising each copy of the first matrix by replacing a subset of the first plurality of symbols with a plurality of independently randomly selected replacement sets of symbols to create a plurality of second outcomes. The method further comprises displaying the plurality of second outcomes, and evaluating each of the second outcomes for winning combinations of symbols.

According to yet another aspect of the invention, a method of playing a wagering game comprises receiving a wager and generating a randomly selected first outcome of a first wagering game, the first outcome comprising a first plurality of symbols arranged in a first matrix. The method further comprises generating a randomly selected second outcome of a second wagering game, the second outcome comprising a second plurality of symbols arranged in a second matrix and simultaneously displaying the first outcome and the second outcome on at least one display. The method further comprises awarding a first award for a winning combinations of symbols included in the first outcome, evaluating a first eligibility criteria for the player to receive a second award for a winning combination of symbols included in the second outcome, and if the eligibility criteria is satisfied, awarding the second award to the player.

According to yet another aspect of the invention, one or more computer readable storage media is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

Figure 1A:
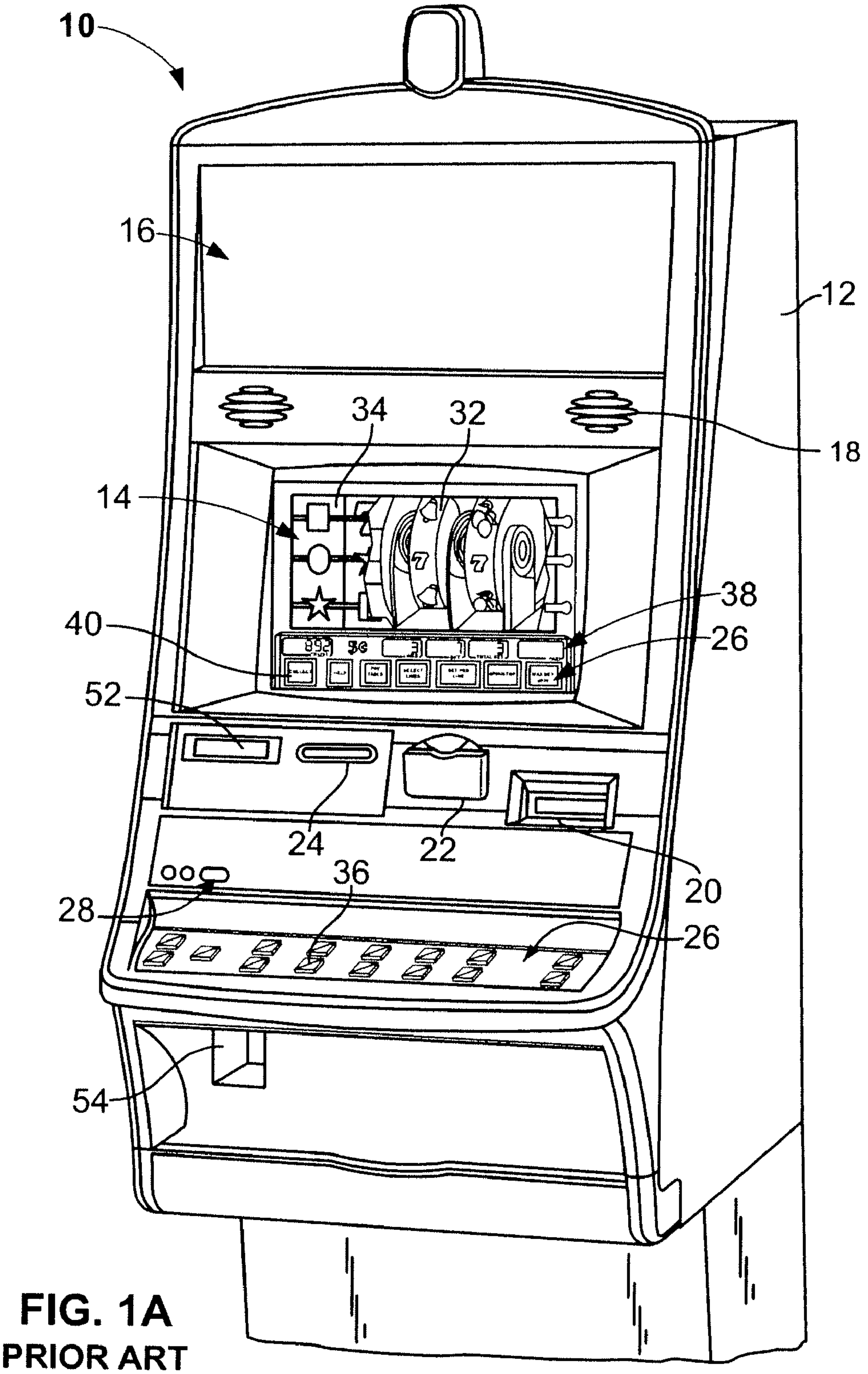
FIG. 1A PRIOR ART
FIG. 1*a* is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
FIG. 1B PRIOR ART
FIG. 1*b* is a perspective view of a handheld gaming terminal according to an embodiment of the present invention.

Referring to FIG. 1*a*, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming as shown in FIG. 1*b*, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, emails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

FIG. 1*b* illustrates a portable or handheld device primarily used to display and/or conduct wagering games. The handheld device may incorporate the same features as the gaming terminal 10 or variations thereof. A more detailed description of a handheld device that may be utilized with the present invention can be found in PCT Patent Application No. PCT/US2007/000792 filed Jan. 26, 2007, entitled "Handheld Device for Wagering Games," which is incorporated herein by reference in its entirety.

Figure 2:
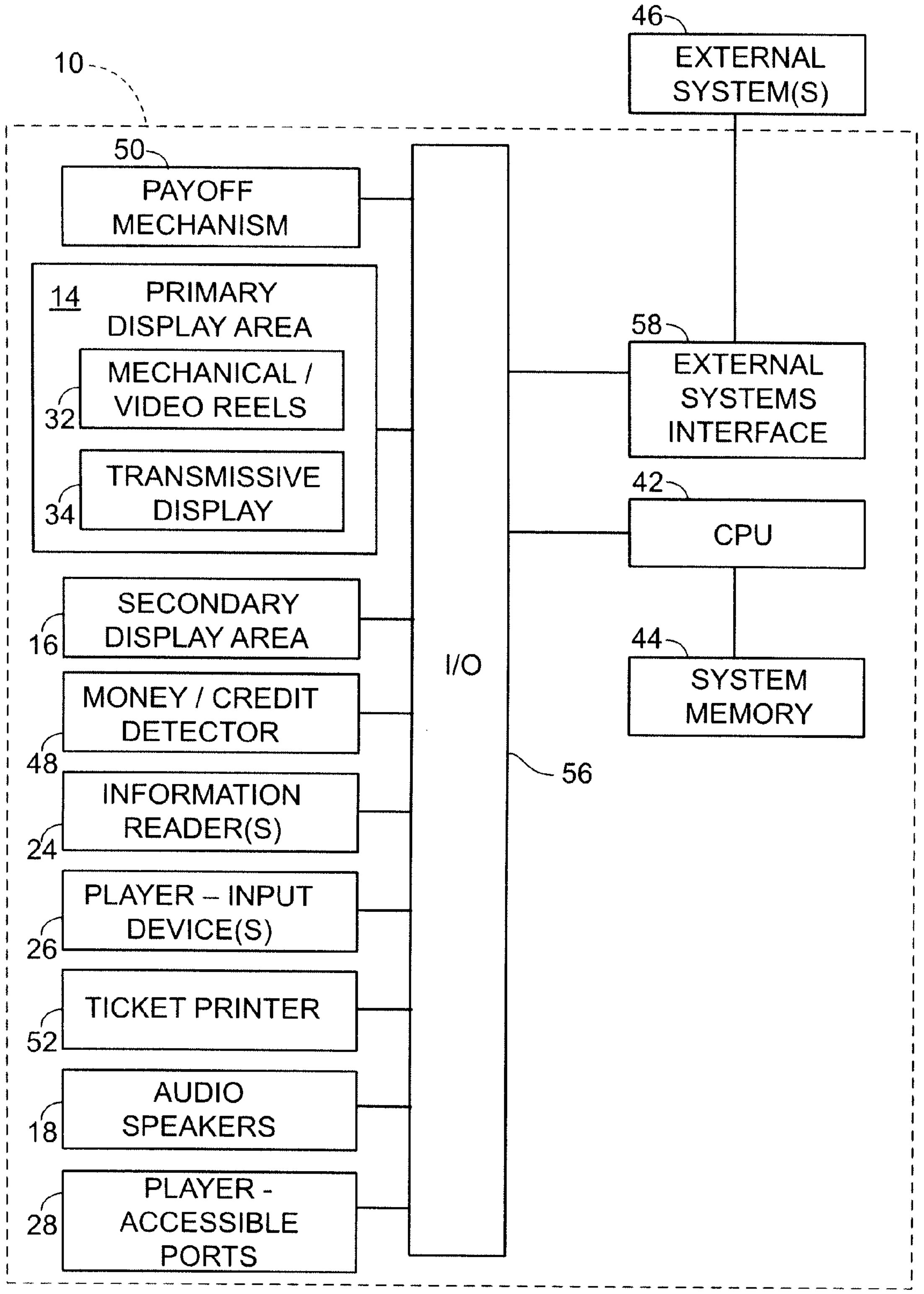
FIG. 2 PRIOR ART
FIG. 2 is a schematic view of a gaming system according to an embodiment of the present invention.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services or any combination thereof. Such payoff may be associated with a ticket (from a ticket printer 52), portable data unit (e.g., a card), coins, currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
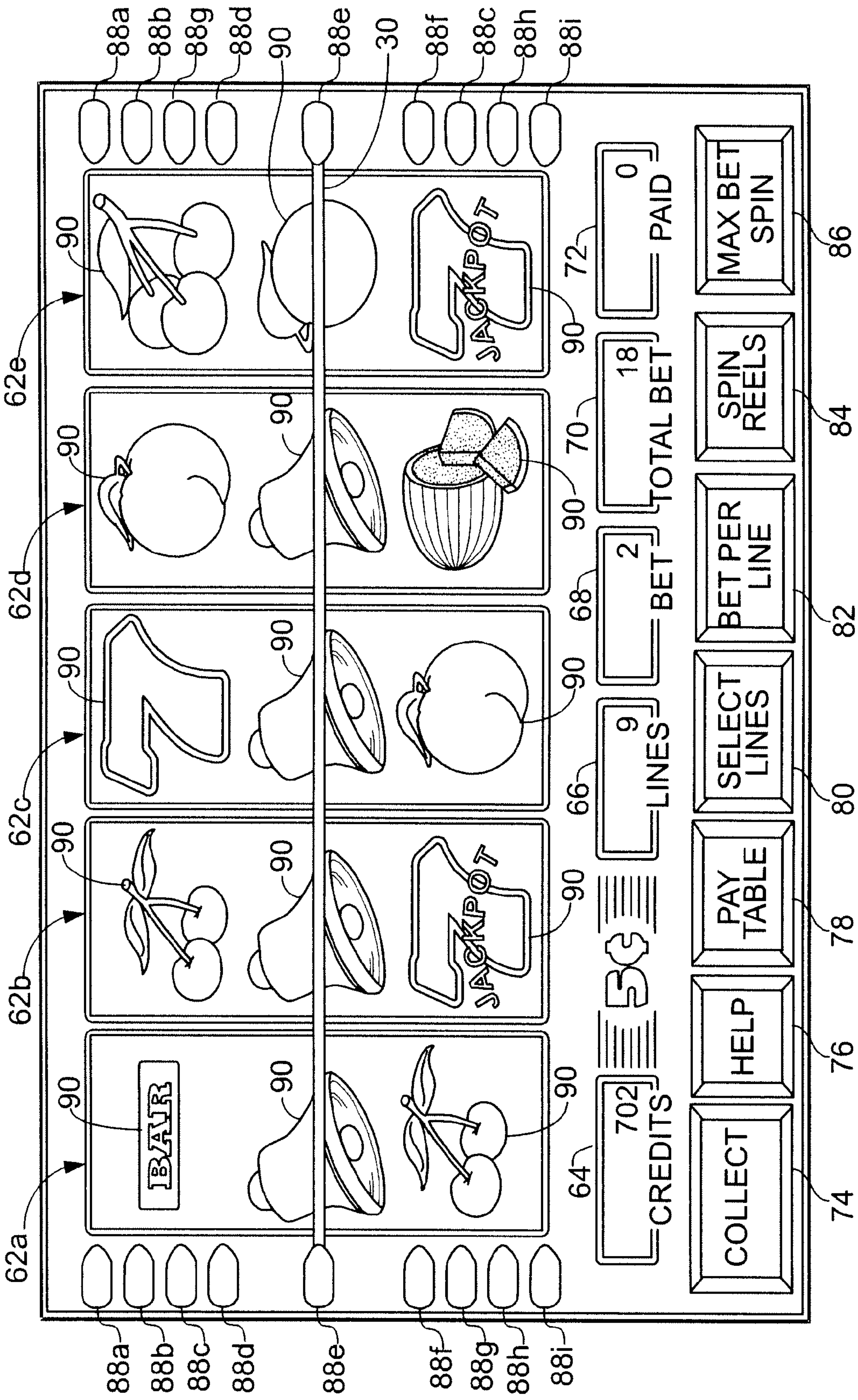
FIG. 3 PRIOR ART
FIG. 3 is an image of a basic-game screen of a wagering game that may be displayed on a gaming terminal, according to an embodiment of the present invention.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
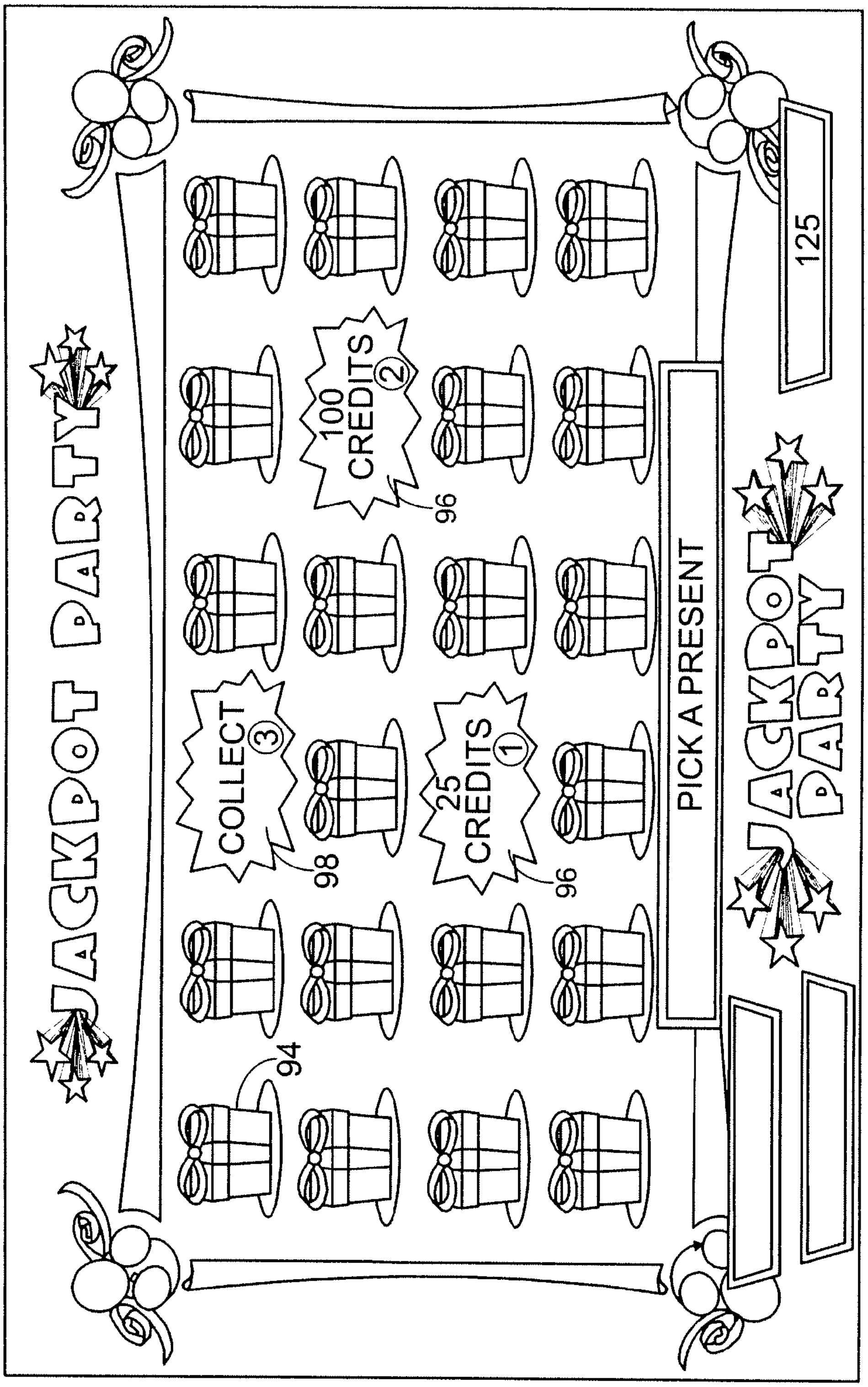
FIG.4 PRIOR ART
FIG. 4 is an image of a bonus-game screen of a wagering game that may be displayed on a gaming terminal, according to an embodiment of the present invention.

Turning now to FIG. 4, a bonus game that may be included with a basic wagering game is illustrated, according to one embodiment. A bonus-game screen 92 includes an array of markers 94 located in a plurality of columns and rows. The bonus game may be entered upon the occurrence of a special start-bonus game outcome (e.g., symbol trigger, mystery trigger, time-based trigger, etc.) in or during the basic wagering game. Alternatively, the illustrated game may be a stand-alone wagering game.

In the illustrated bonus game, a player selects, one at a time, from the array of markers 94 to reveal an associated bonus-game outcome. According to one embodiment, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
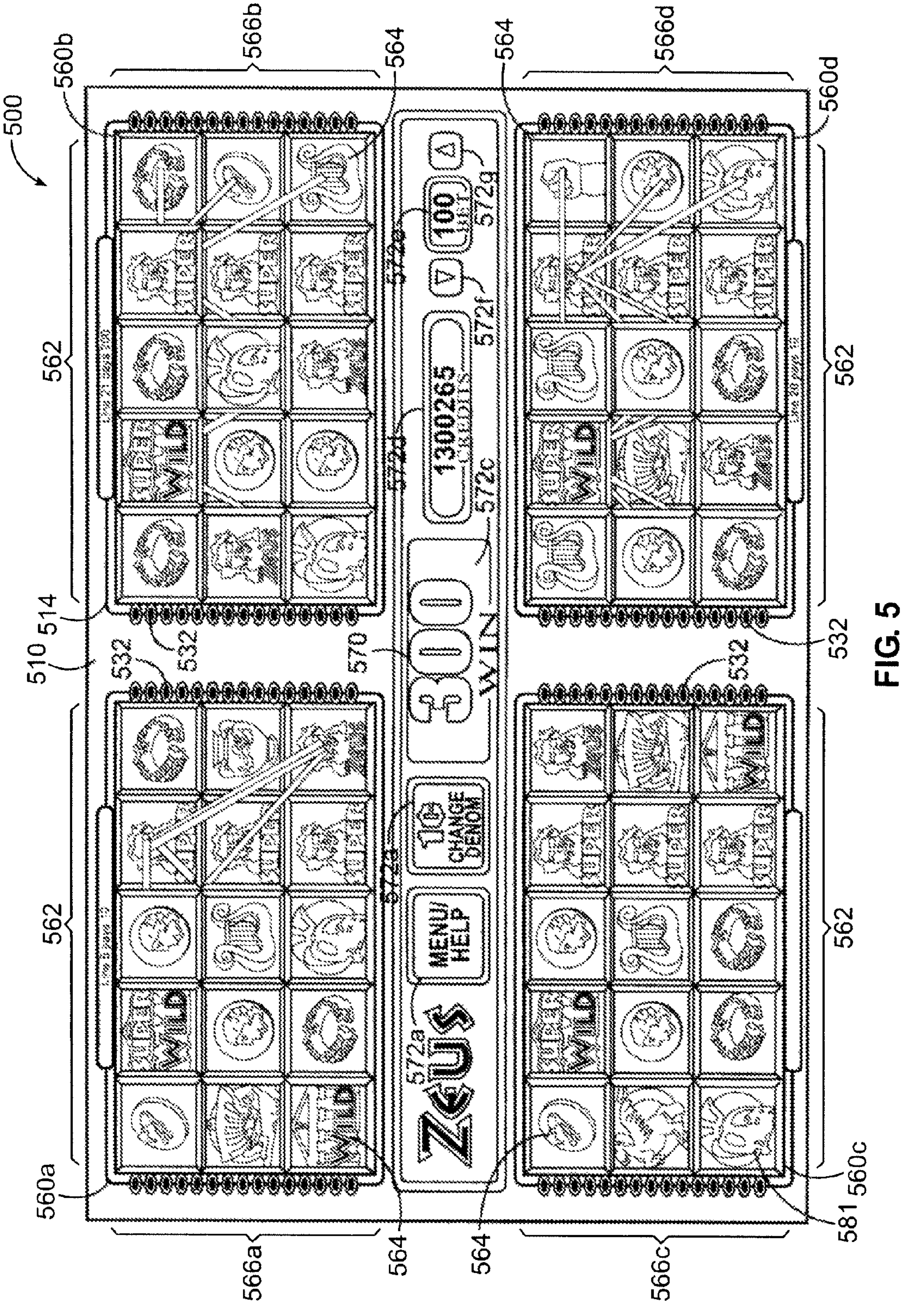
FIG. 5 is a screen shot of a plurality of wagering games which include a shared feature.

Referring now to FIG. 5, a primary display 514 of a gaming device or terminal 510 of a gaming system 500 is shown displaying a plurality of primary wagering games 560*a-d*. The device or terminal 510 may be a freestanding gaming device as seen in FIG. 1*a*, a handheld device as seen in FIG.

1*b*, or any other device having a display 514. In this embodiment, the primary wagering games 560*a-d* are slot games, each of which comprises a plurality of symbol bearing reels 562 which are varied (i.e., spun and stopped) to reveal combinations of symbols 564 which are evaluated for winning combinations. The symbols 564 may include any variety of graphical symbols, elements, or representations, including symbols 564 which are associated with one or more themes of the gaming terminal 510 or system 500. The symbols 564 may also include a blank symbol or empty space. As described herein, the symbols 564 landing on active paylines 532 with each primary wagering game 560*a-d* (the paylines 532 for which a wager has been received) are evaluated for winning combinations. If a winning combination of symbols 564 lands on an active payline 532, a primary award is awarded in accordance with one or more pay tables of the gaming device 510. In each of the primary wagering games 560*a-d*, the symbols 564 on the reels 562 form an array 566*a-d* or matrix of symbols 564, having a number of rows and columns, which in the embodiment shown is three rows and five columns. In alternate embodiments, the arrays 566*a-d* may have greater or fewer symbols 564, and may take on a variety of different forms having greater or fewer rows and/or columns. The arrays 566 may even comprise other non-rectangular forms or arrangements of symbols 564.

The primary display 514 further includes a control bar 570 for displaying information to a player. The control bar 570 includes a Menu/Help button 572*a*, a Denom button 572*b*, a Win Meter 572*c*, a Credits Meter 572*d*, a Bet Meter 572*e*, and Bet Change buttons 572*f,g*. The Menu/Help button 572*a* can be pressed and activated (through an overlying touch screen for example) by a player desiring to access other control menus, preferences, and help screens. The Denom button 572*b* can be pressed by a player to change the denomination of wagers which the player is inputting into the system 500. The Win Meter 572*c* displays to the player the amount of the total win (if any) from the most recent play of the wagering games 560*a-d*. The Credits Meter 572 displays to the player the total amount of credits (if any) remaining and available to the player for play of the wagering games 560*a-d*. The Bet Meter 572*e* displays to a player the current size of his wager (in credits), while the Bet Change buttons 572*f,g* permit the player to increase or decrease the size of his wager accordingly.

In one embodiment of the invention, the primary wagering games 560*a-d* are the same wagering game such that each wagering game 560*a-d* utilizes the same set of symbols. In such an embodiment, the wagering games 560*a-d* are configured in the same way (same number of paylines, same arrangement of rows and columns, same theme, etc.) In other embodiments, the wagering games 560*a-d* may be different in any of these (and other) aspects. Moreover, in the embodiment shown in FIG. 5, the wagering games 560*a-d* operate independently in that different randomly generated outcomes are presented on each game 560*a-d*. That is, on a particular play of the games 560*a-d* (when a spin button is pressed for example), each of the four wagering games 560*a-d* spins and stops the symbol bearing reels 562 therein to reveal randomly selected combinations of symbols 564 which are evaluated for winning combinations, as described herein. Thus, the result of each wagering game 560*a-d* is independent from the other wagering games 560*a-d* on any particular spin. In alternative embodiments, the results of the wagering games 560*a-d* may be the same (displayed copies of one another), or may be dependent upon the results of others of the wagering games 560*a-d* displayed.

Figure 6:
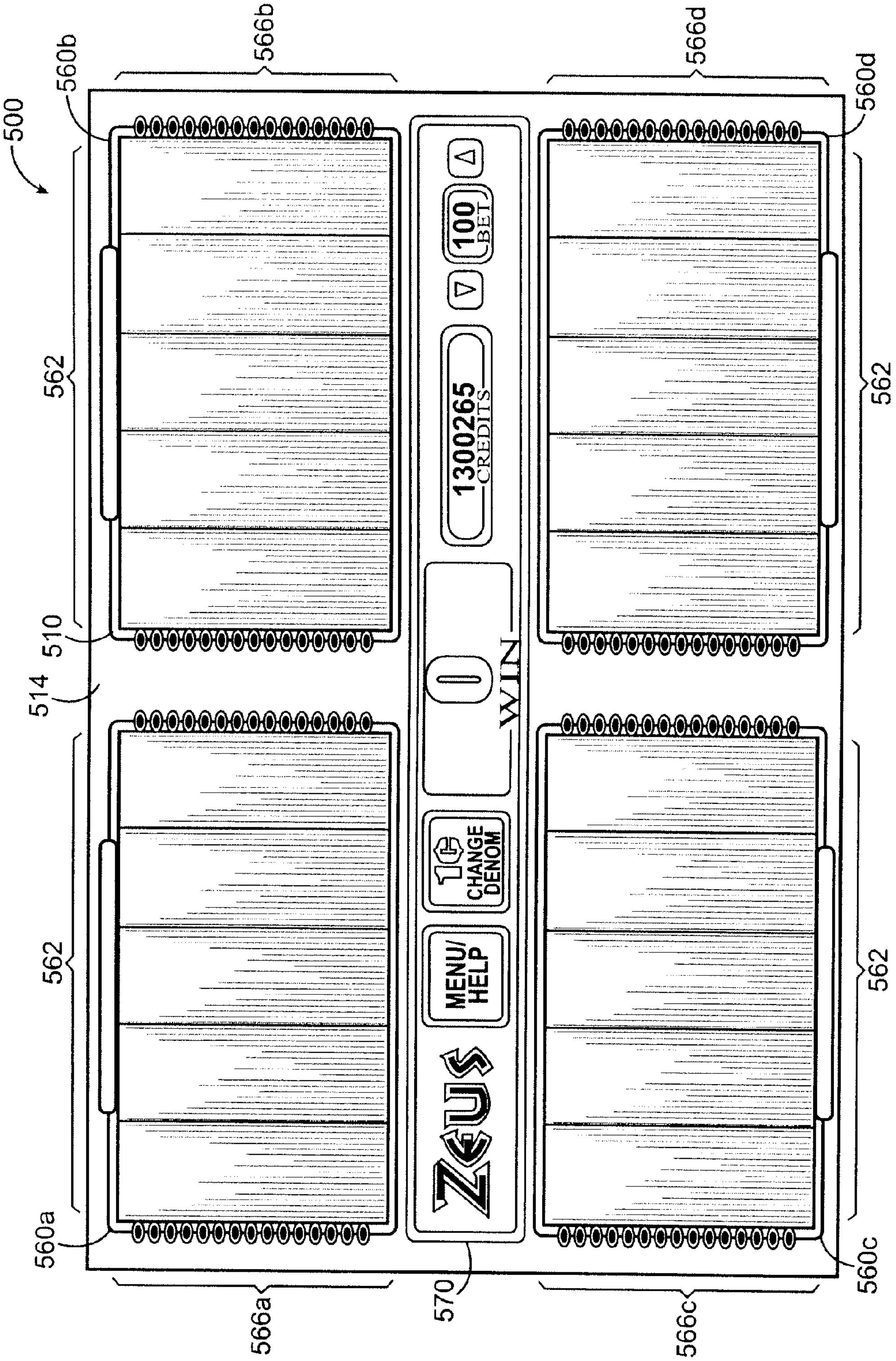
FIG. 6 is a screen shot of the plurality of wagering games while the reels of such games are in motion.
Figure 7:
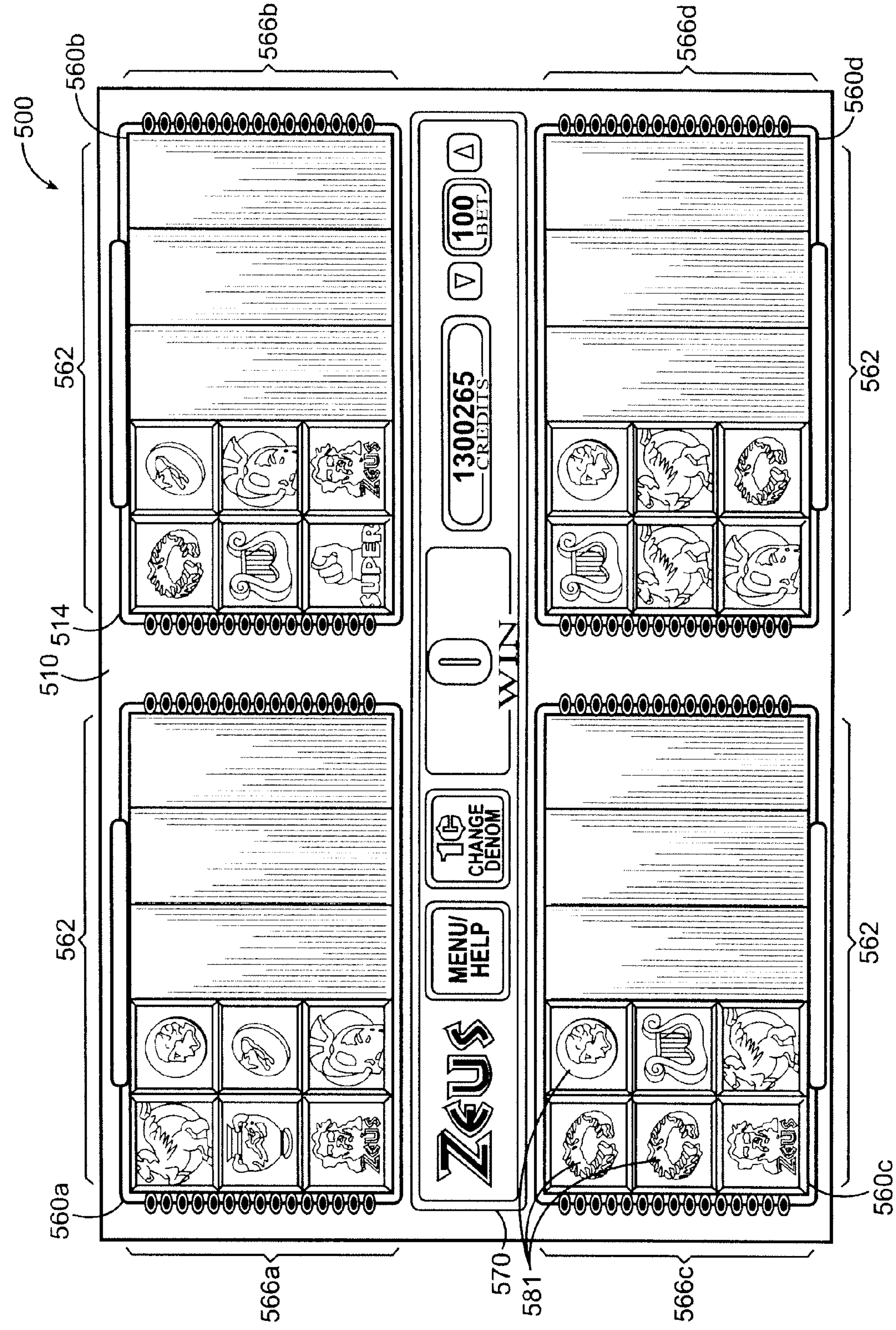
FIG. 7 is a screen shot of the plurality of wagering games while some of the reels are stopped and other reels remain in motion.

Turning to FIG. 6, a player playing the wagering games 560*a-d* has placed an appropriate wager to commence a play of the games 560*a-d*. The player has initiated the play of the games 560*a-d* with an appropriate input device, such a spin button, and the reels 562 of the various games 560*a-d* are shown spinning and in motion, prior to stopping to reveal the randomly selected outcomes for each game 560*a-d*. In the embodiment shown in FIGS. 5 and 6, the reels 562 in each game 560*a-d* stop in a sequential order, which in this embodiment is left to right. Thus, as seen in FIG. 7, the first reel 562 (the left most reel) in each game 560*a-d* is configured to stop first and to display the symbols 564 thereon. The remaining reels 562 remain spinning after the first reel 562 stops. Next, the second reel 562 (the one directly to the right of the first reel) stops shortly thereafter to reveal the symbols 564 thereon. This pattern continues until all five reels 562 in each game 560*a-d* have stopped to reveal the entire matrix 566*a-d* of symbols 564 comprising the randomly selected outcome in each wagering game 560*a-d*. In the embodiment shown in FIGS. 5-7, the reels 562 in each game 560*a-d* stop in their predetermined order (left to right) with only a short time delay in between each reel 562. For example, the second reel may stop 0.5 seconds after the first reel, the third reel may stop 0.5 seconds after the second reel, etc. This causes all five reels 562 in each game 560*a-d* to stop in a short amount of time, yet still in their predetermined order. In alternative configurations, the reels 562 may stop at the same time, in other predetermined orders, in a random order, and with differing time gaps between reels, which may be either longer or shorter than described with reference to the displayed embodiment.

Figure 8:
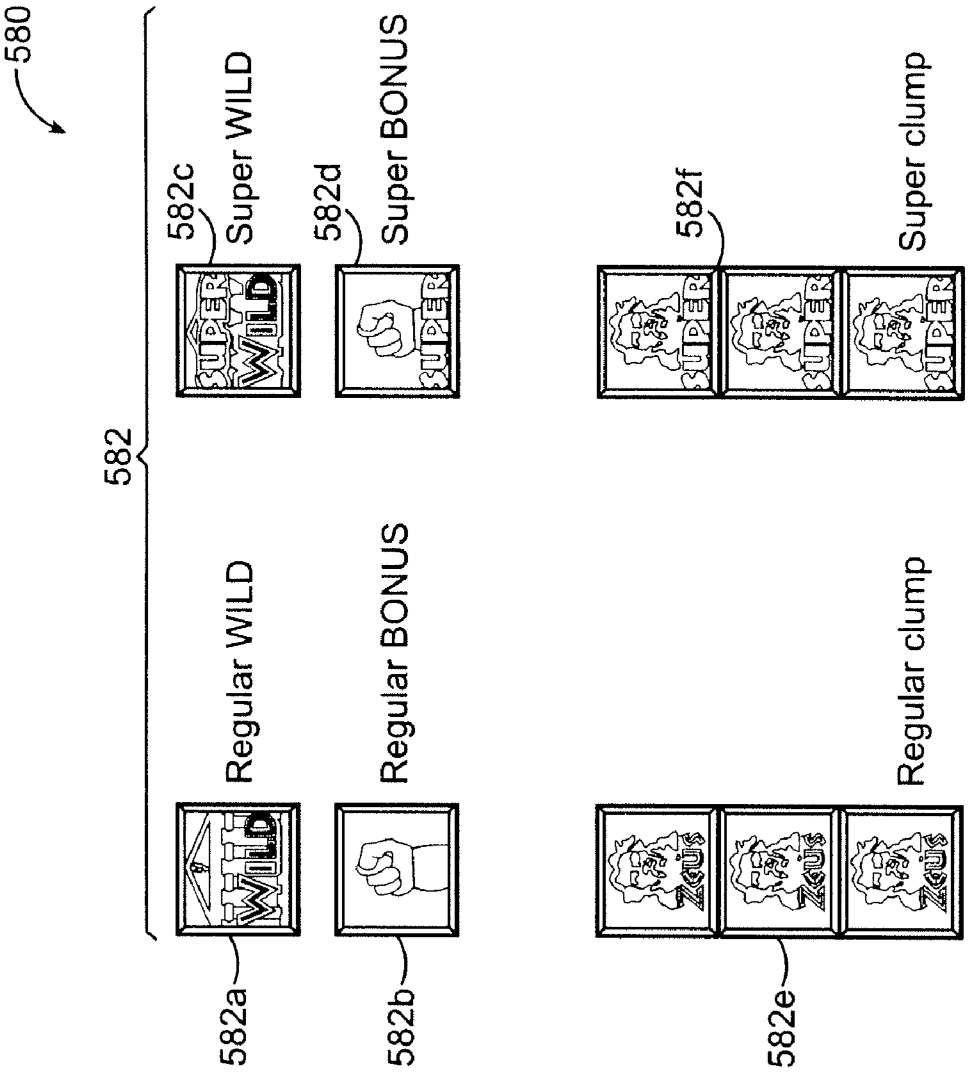
FIG. 8 is a depiction of a symbol chart showing special symbols used the wagering games and shared feature therein.

Turning to FIG. 8, a symbol chart 580 containing special symbols 582*a-f* is shown. The symbols 564 used in the wagering games 560*a-d* include standard symbols 581 (see FIGS. 5-7) and special symbols 582. The standard symbols 581 are symbols which are listed in a paytable of the gaming system 500, such that when two or more like standard symbols 581 land on an activated payline 532, an associated award is awarded. The special symbols 582 are symbols which have a special functionality associated with them. For example, a first special symbol 582*a* is a WILD symbol, which substitutes for any other standard symbol 581 to complete or form winning combinations in each wagering game 560*a-d*. A second special symbol 582*b* is a BONUS symbol. Certain combinations of BONUS symbols 582*b* occurring in an outcome of the wagering games 560*a-d* result in a secondary or bonus event being triggered, such as the bonus game described with reference to FIG. 4. A third special symbol 582*c* is a SUPER WILD symbol, which acts like the WILD symbol 582*a*, but additionally offers an enhancement thereto, such as a multiplier for example. A fourth special symbol 582*d* is a SUPER BONUS symbol, which acts like the BONUS symbol 582*b*, but additionally offers an enhancement thereto, such as a multiplier for example. A fifth special symbol 582*e* is a CLUMPED symbol, which comprises a plurality of standard symbols 581 linked or "clumped" together such that when it appears in the matrix 566*a-d* of a wagering game 560*a-d*, the symbols are next to one another (vertically in this embodiment) as displayed. This increases the likelihood of a winning combination due to the multiple occurrences of the standard symbol 581 being "clumped." A sixth special symbol 582*f* is a SUPER CLUMPED symbol, which acts like the CLUMPED symbol 582*e*, but additionally offers an enhancement thereto, such as a multiplier for example. In other embodiments, additional special symbols 582 may be provided and used within the wagering games 560*a-d*, or the games 560*a-d* may be played only with standard symbols 581 and not utilize any special symbols 582.

Figure 9:
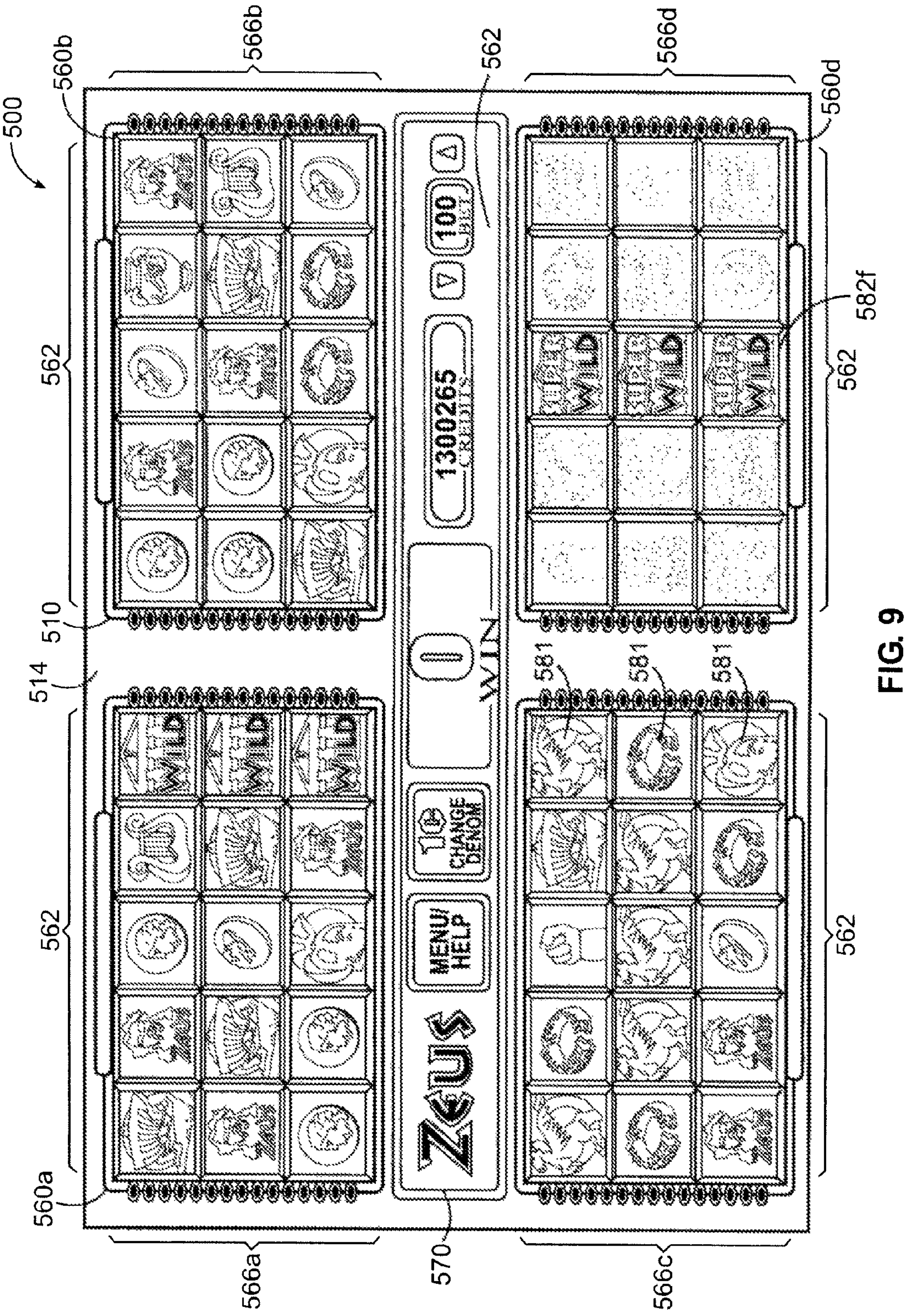
FIG. 9 is a screen shot of a play of the wagering games of FIG. 5 in which a special symbol occurs in the wagering games.
Figure 10:
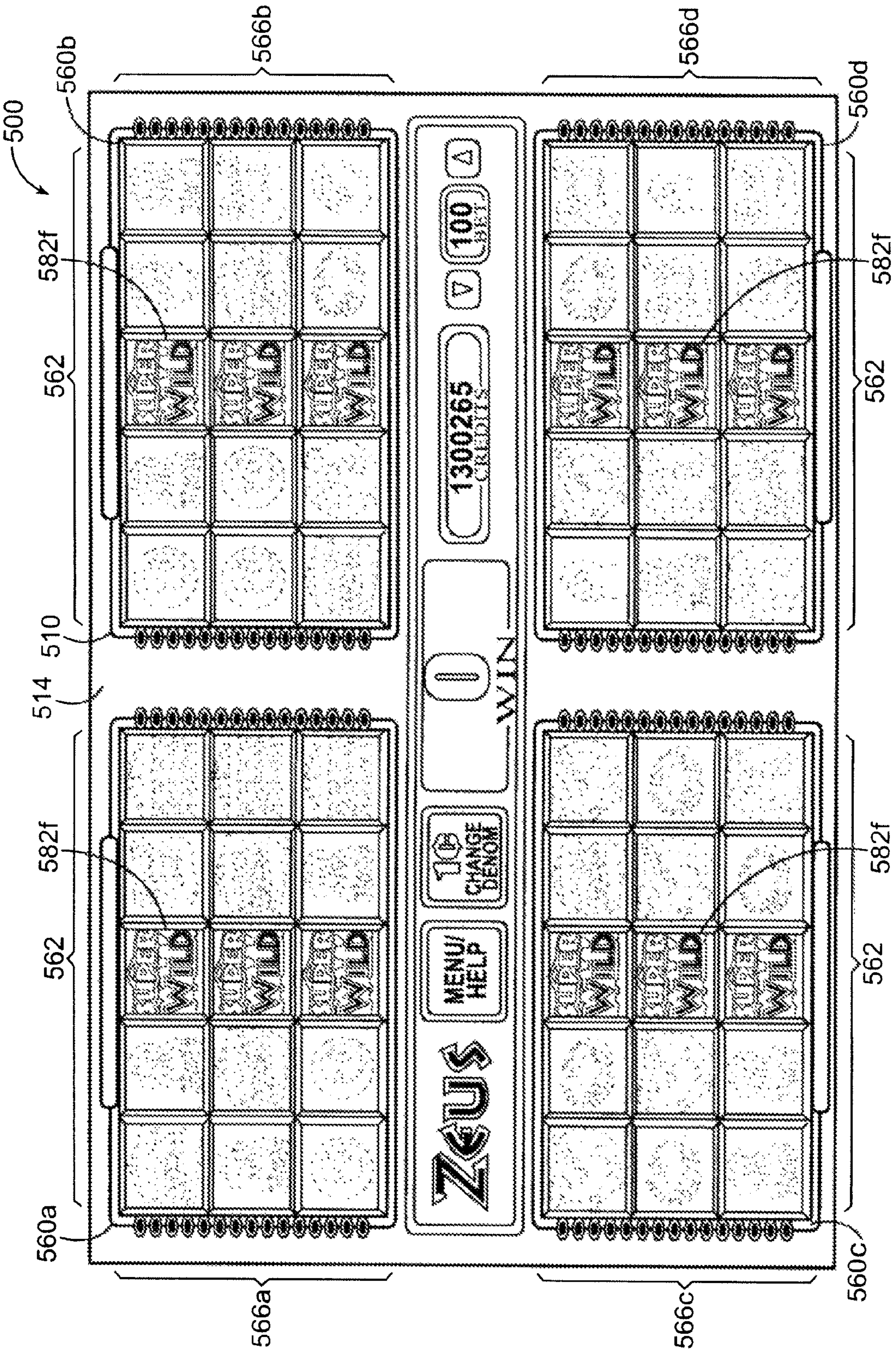
FIG. 10 is a screen shot of a play of the wagering games in which a shared feature is activated.

Turning to FIG. 9, another play of the wagering games 560*a-d* is displayed in which one or more features are shared between or amongst the games 560*a-d*. In this play of the games 560*a-d*, the reels 562 have spun and stopped to reveal the randomly selected outcomes comprising symbols 564 on the reels 562 in each game 560*a-d*. In one of the games 560*d*, a special symbol 582 has occurred in the randomly selected outcome, which in this case is a SUPER CLUMPED 582*f* special symbol. Turning to FIG. 10, upon the occurrence of a triggering event, a shared feature of the wagering games 560*a-d* causes one or more symbols 564 to be copied from one or more of the wagering games 560*a-d* into another one or more of the wagering games 560*a-d*. In the embodiment shown, the shared feature comprises copying of any special symbol 582 landing in the games 560*a-d* to the same position in each of the other wagering games 560*a-d* displayed. Thus, the triggering event in this embodiment is the occurrence of a special symbol 582 in one of the outcomes of the games 560*a-d* displayed. In FIG. 10, because the SUPER CLUMPED 582*f* special symbol has landed in the matrix 566*d* of the fourth wagering game 560*d*, it is copied to the same position (the third column) of the matrices 566*a-c* of each of the other wagering games 560*a-c* displayed. As a result of the shared feature, the third reel 562 (or middle column of symbols 564) in each of the wagering games 560*a-d* is transformed to the SUPER CLUMPED 582*f* symbol which originally occurred only in the fourth wagering game 560*d*.

Figure 11:
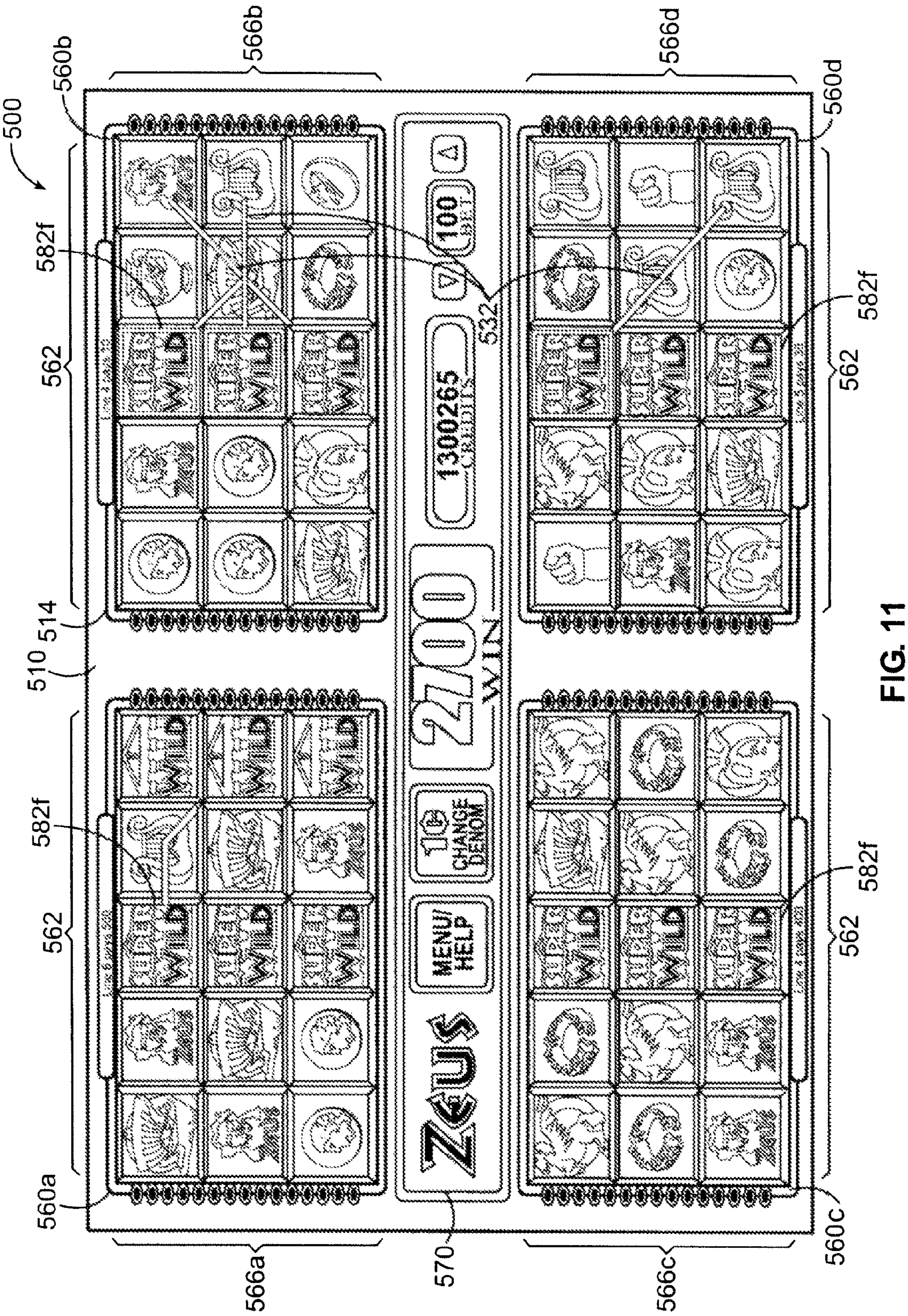
FIG. 11 is a screen shot of a play of the wagering games following completion of the shared feature.

As seen in FIG. 11, after the shared feature is executed, each of the wagering games 560*a-d* is evaluated for winning combinations, and any associated awards are paid and provided to the player. In this case, the player is awarded 2700 credits for the wins which have occurred in all four wagering games 560*a-d*, as seen in the WIN meter 572*c*. The resulting winning combinations of symbols 564 for which awards are provided are displayed to the player on the primary display 514, and highlighted by illumination of the activated paylines 532 passing through such winning combination of symbols 562. In one embodiment, the player may be paid for the outcomes in the wagering games 560*a-d* prior to the execution of the shared feature (copying of special symbols to other games 560*a-d*). In another embodiment, the player may be paid only for the resulting outcomes of the wagering games 560*a-d* after the shared feature is executed and the special symbols 582 have been copied to the other games 560*a-d*. In yet another embodiment, the player may be paid for both the combinations of symbols 564 existing before the execution of the shared feature, and for the modified combinations of symbols 564 in the resulting outcomes of the wagering games 560*a-d* after the shared feature is executed and the special symbols 582 have been copied.

Figure 12:
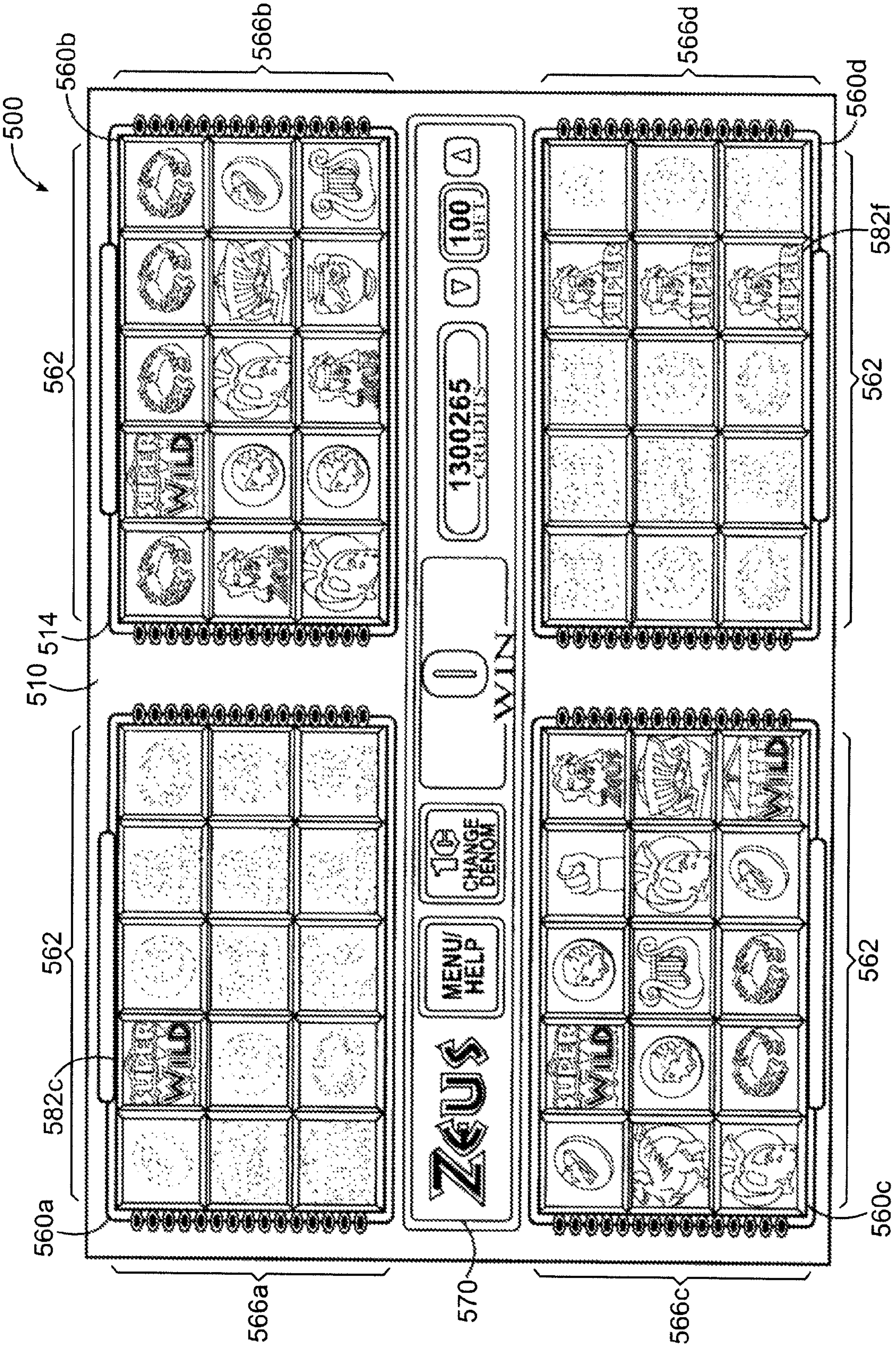
FIG. 12 is a screen shot of another play of the wagering games of FIG. 5 in which another special symbol occurs in the wagering games.
Figure 13:
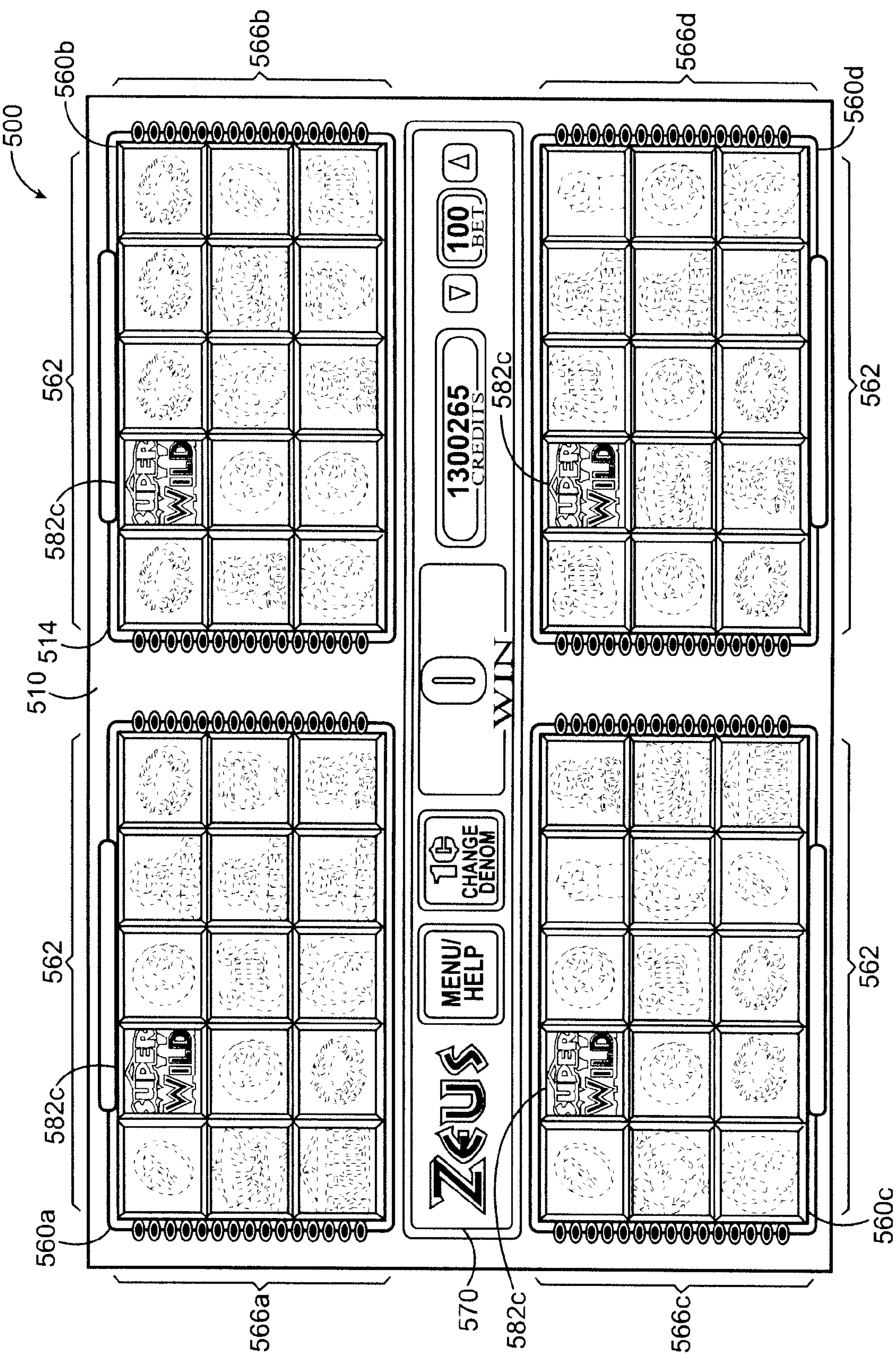
FIG. 13 is a screen shot of a play of the wagering games in which a shared feature is activated.
Figure 14:
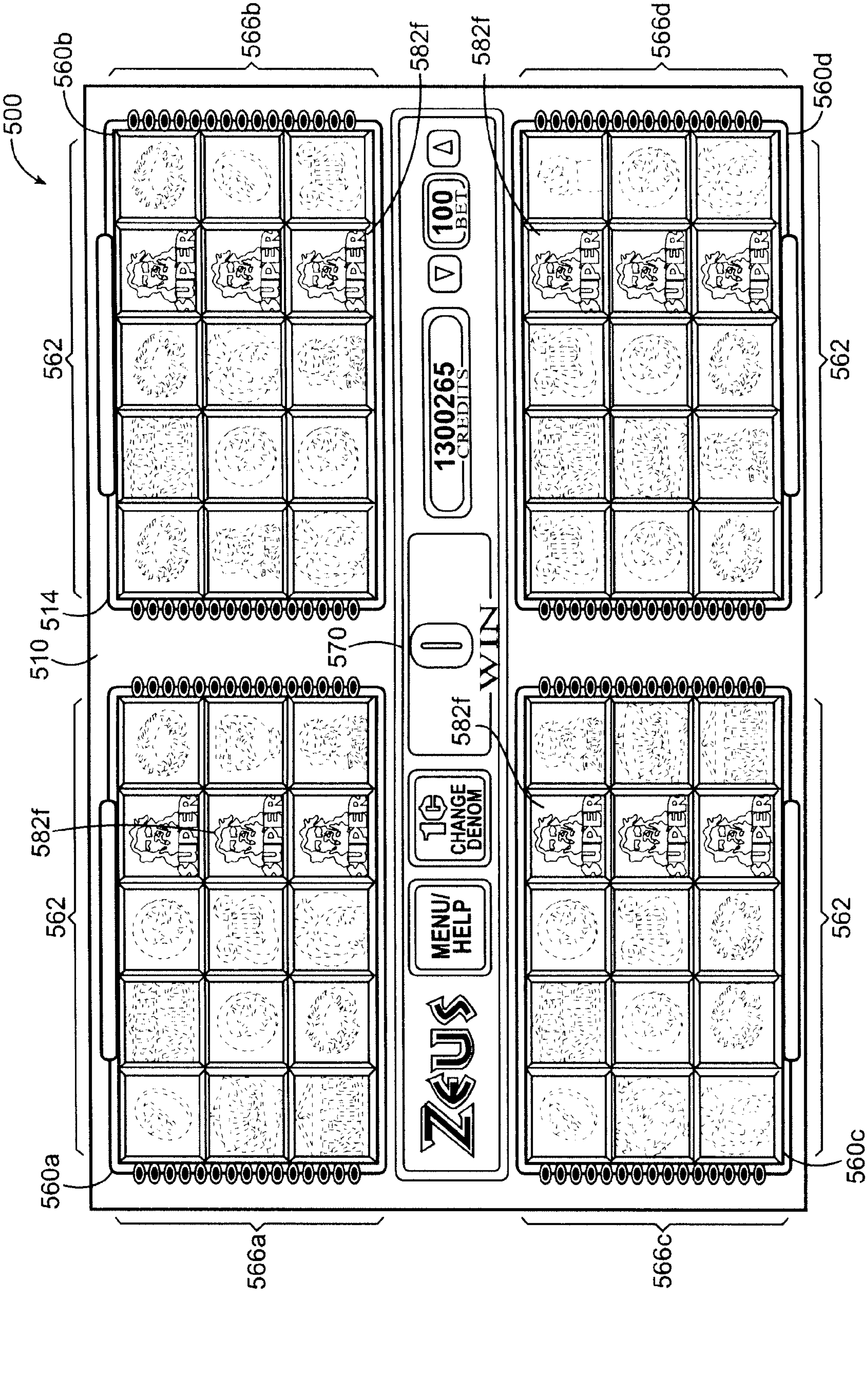
FIG. 14 is another screen shot of a play of the wagering games in which a shared feature is activated.
Figure 15:
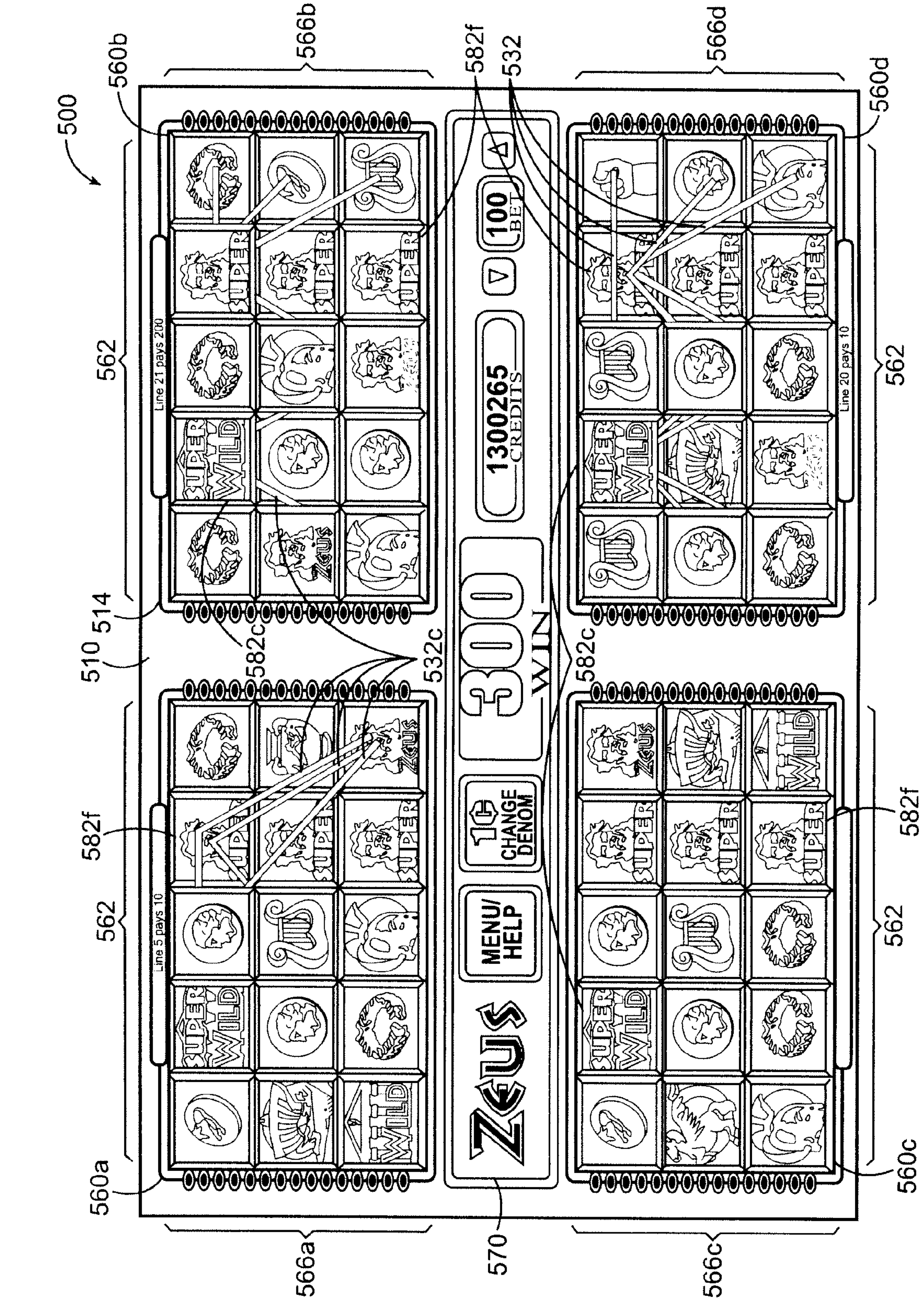
FIG. 15 is a screen shot of a play of the wagering games following completion of the shared feature.

Another example of a shared feature being executed is displayed in FIG. 12. On this play of the wagering games 560*a-d*, two special symbols 582 have landed or occurred in the outcomes of the various wagering games 560*a-d*. Specifically, a SUPER WILD 582*c* symbol has occurred in the first wagering game 560*a*, located in the first row, second column position. Additionally, a SUPER CLUMPED 582*f* symbol has occurred in the fourth wagering game 560*d*, located in the fourth column. In this embodiment, the shared feature acts to copy the special symbols 582 from the position in the game 560 in which they occurred to the same position in each of the other games 560 displayed, as described. Thus, turning to FIG. 13, the SUPER WILD 582*c* symbol in the first game 560*a* is copied to the same position (first row, second column) in each of the other games 560*b-d*. Similarly, turning to FIG. 14, the SUPER CLUMPED 582*f* symbol in the fourth game 560*d* is copied to the same position (fourth column) in each of the other games 560*a-c*. After the shared feature is done performing the copying operations described, the resulting outcomes of each wagering game 560*a-d* is displayed containing the copied special symbols 582, as seen in FIG. 15. Now each of the four games 560*a-d* includes a SUPER WILD symbol 582*c* in the first row, second column position and a SUPER CLUMPED symbol 582*f* in the fourth column position. The modified outcomes are now evaluated for winning combinations, which as before, are paid in accordance with one or more paytables of the gaming system 500. Activated paylines are highlighted to display and emphasize the winning combinations, as seen in FIG. 15. Again, the player may be paid for winning combinations of symbols before and/or after the shared feature is executed.

Figure 16:
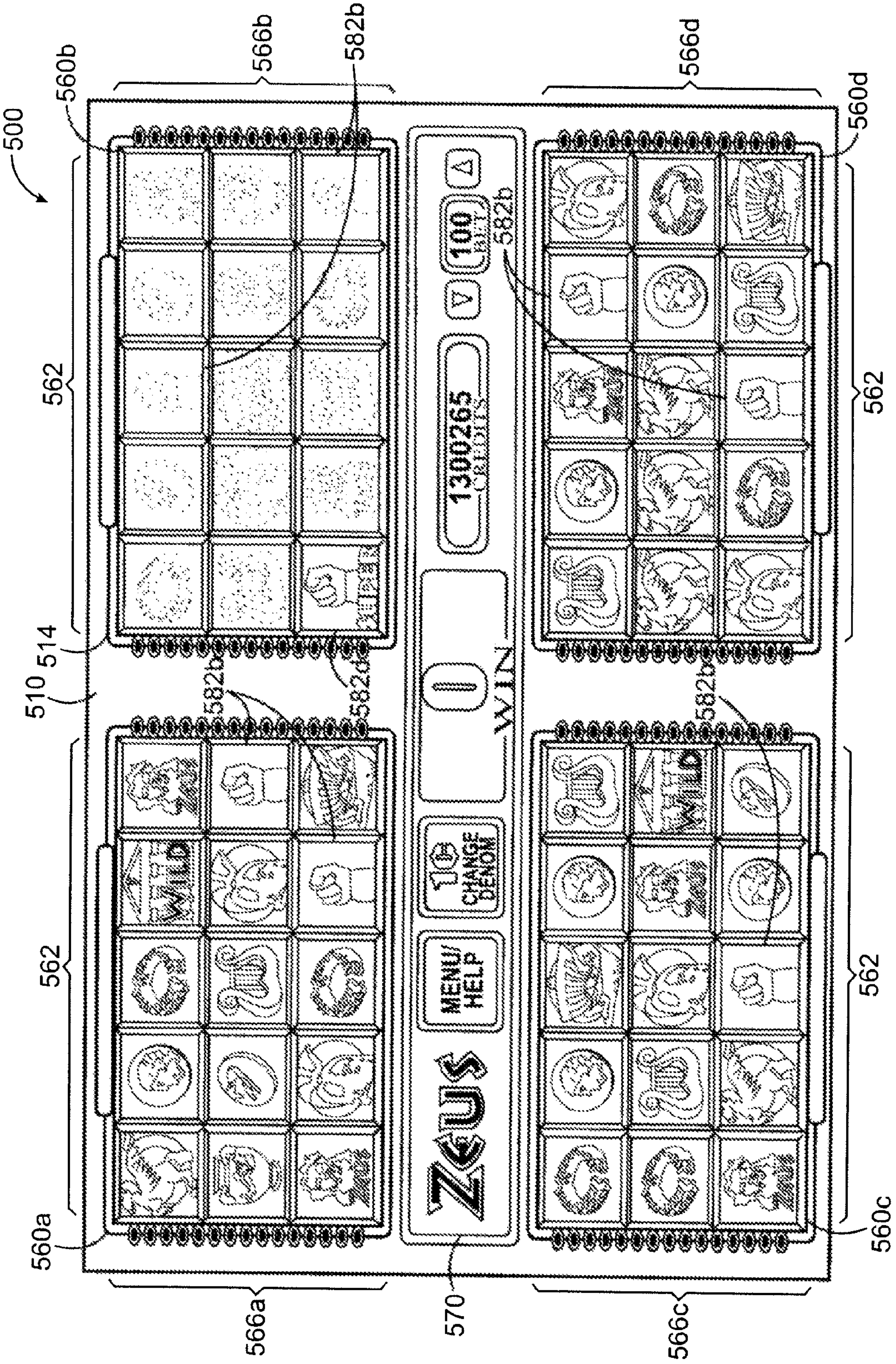
FIG. 16 is a screen shot of yet another play of the wagering games of FIG. 5 in which another special symbol occurs in the wagering games.
Figure 17:
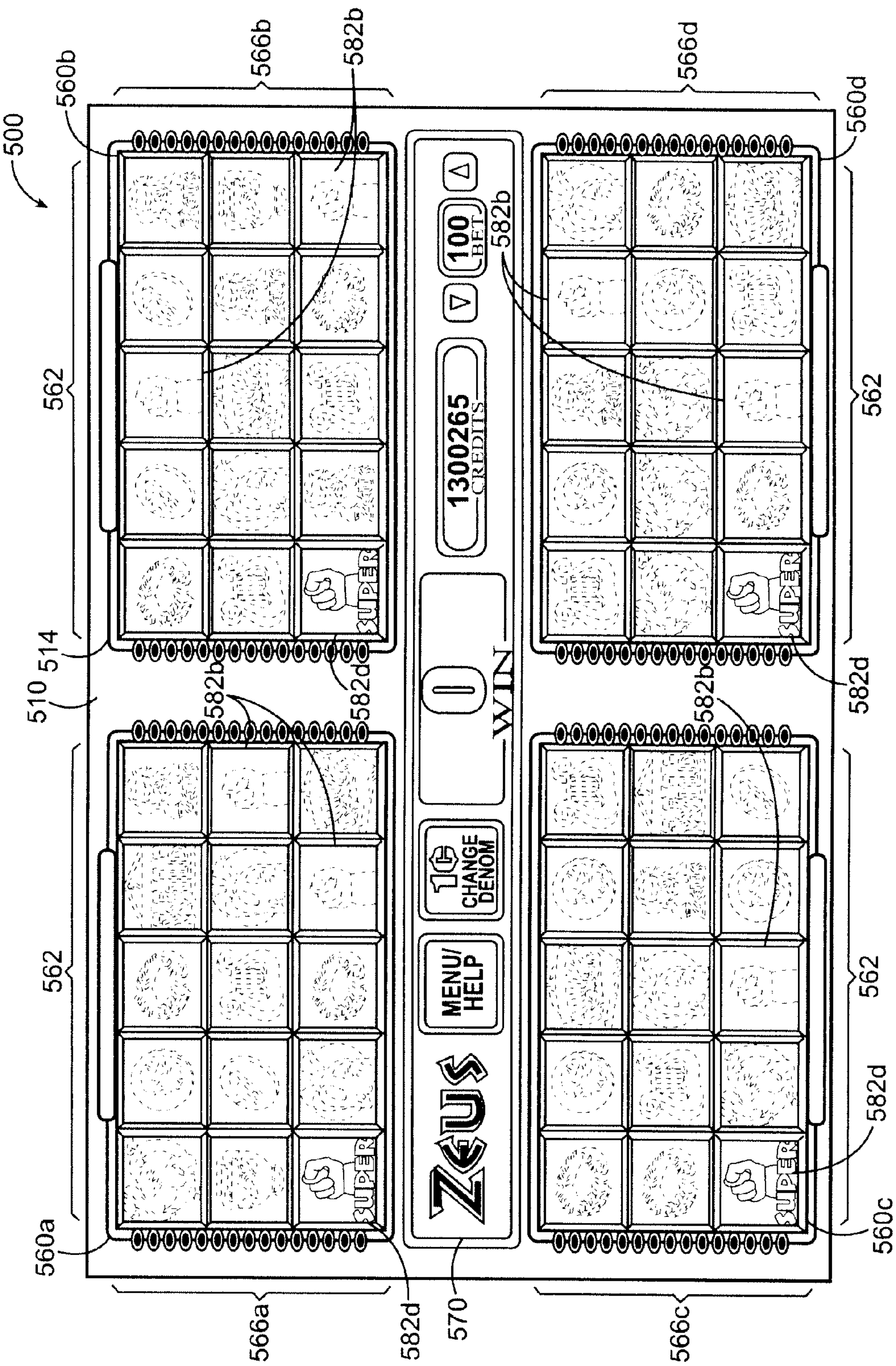
FIG. 17 is a screen shot of a play of the wagering games in which a shared feature is activated.
Figure 18:
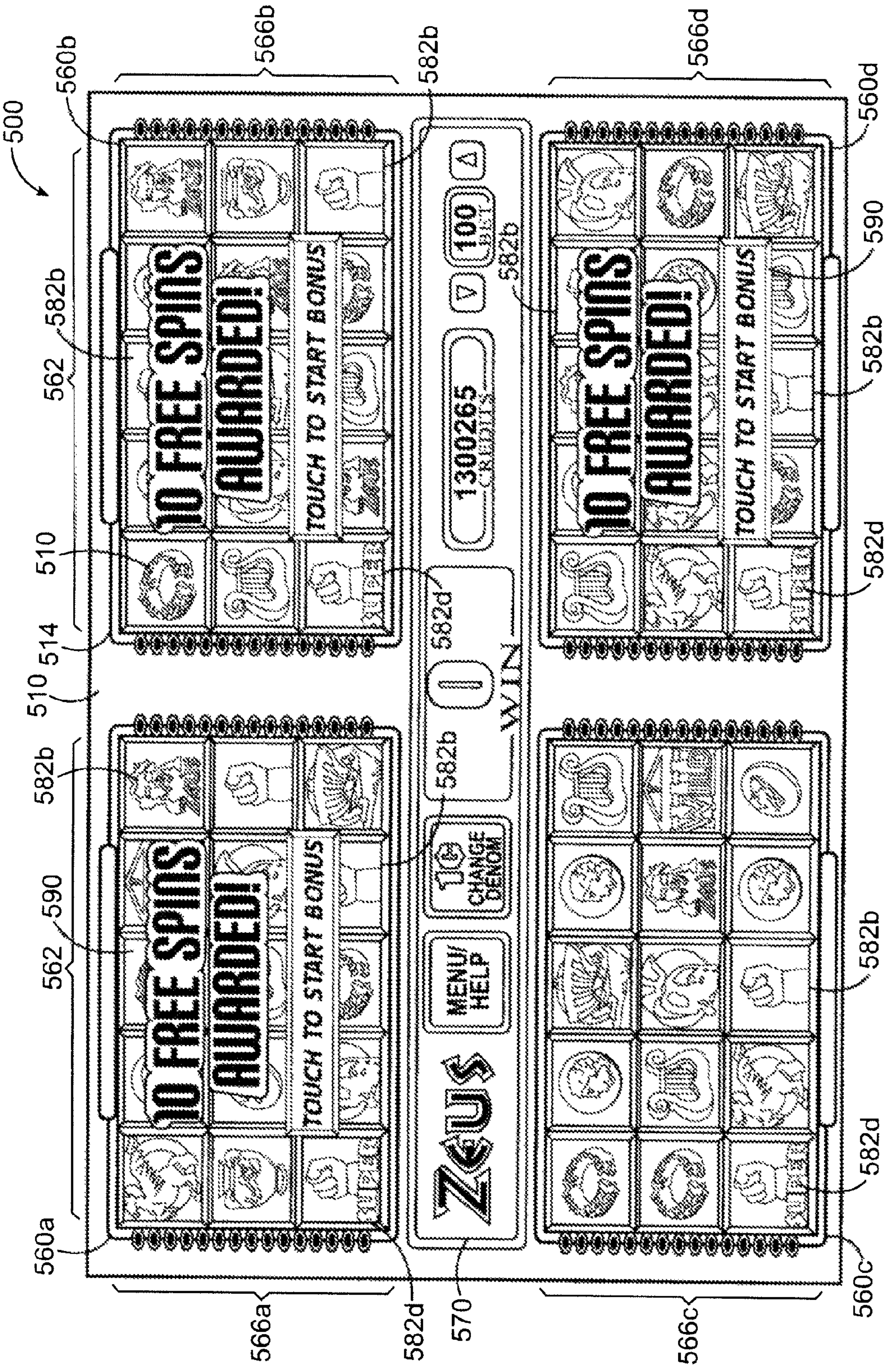
FIG. 18 is a screen shot of a play of the wagering games following completion of the shared feature and a bonus game is triggered.

Yet another embodiment of a shared feature amongst a plurality of games 560 is displayed and described with reference to FIGS. 16-19. In FIG. 16, the primary display 514 is shown displaying a plurality of wagering games 560*a-d*. In this embodiment, the shared feature is triggered again by the occurrence of a SUPER BONUS symbols 582*d* in the randomly selected outcome of the second wagering game 560*b*. In this embodiment, a bonus game is triggered when three or more BONUS symbols 582*b* (in this case, a hand holding a lightning bolt) appear anywhere in the matrix 566 the outcome of a wagering game 560. The bonus game is a free spin game, as described further herein. Because the SUPER BONUS symbol 582*d* is a special symbol, the shared feature is triggered whereby special symbols 582 are copied from the game 560 in which they originated to the same position in the other wagering game 560*a-d* outcomes. Thus, turning to FIG. 17, the SUPER BONUS symbol 582*d* which occurred in the third row, first column position in the outcome of the second wagering game 560*b* is copied to the same position in the outcomes of the other wagering games 560*a,c,d*. As a result of the symbols being copied in response to the shared feature being activated, each of the modified outcomes of the wagering games 560*a-d* includes a SUPER BONUS symbol 582*d* in the third row, first column position, as seen in FIG. 18.

As with the other embodiments, following the activation and completion of the symbol copying operation of the shared feature, the modified outcomes of the various wagering games 560*a-d* are then evaluated for winning combinations. In this case, three of the four wagering games 560*a-d* have modified outcomes which include an arrangement of symbols 564 sufficient to trigger a bonus game 590. In this embodiment collection of three of more BONUS symbols 582*b* (which can be regular BONUS symbols 582*b* or SUPER BONUS symbols 582*d*) triggers a bonus game. After the shared feature is complete, the first wagering game 560*a* include the requisite three BONUS symbols appearing the matrix 566*a*. Two regular BONUS symbols 582*b* (located in the second row, fifth column position and the third row, fourth column position) appeared in the original outcome of the first wagering game 560*a*, shown in FIG. 16. As a result of the shared feature, a third BONUS symbol 582*b* now appears in the modified outcome of the wagering game 560*a*, in the form of the SUPER BONUS symbol 582*d* in the third row, first column position. Thus, the operation of the shared feature causing the SUPER BONUS symbol 582*d* to be copied into the matrix 566*a* of the first wagering game 560*a* has caused a second triggering event to occur, and has satisfied the criteria for triggering the bonus game 590. Without the operation of the shared feature and the copying of the SUPER BONUS symbol 582*d*, the bonus game 590 would not have been triggered (due to only two BONUS symbols 582*b* being present in the matrix 566*a* prior to the copying).

Similarly, in the fourth wagering game 560*d*, the copying of the SUPER BONUS symbol 582*d* has added the requisite third BONUS symbol 582*b* needed to trigger the bonus game 590. The original outcome of the fourth wagering game 560*d* included two BONUS symbols 582*b* (first row, fourth column position and third row, third column position). The shared feature has operated to copy the SUPER BONUS symbol 582*d* into the matrix 566*d*, and thus the bonus game 590 is triggered in the fourth wagering game 566*d* as well, due to the presence of three or more BONUS symbols 582*b*. The second wagering game 560*b* also triggers the bonus game 590 because the original outcome included the necessary three BONUS symbols 582*a* (the SUPER BONUS symbol 582*b* in the third row, first position and the two regular BONUS symbols 582*b* in the first row, third column position and the third row, fifth column position). Like the first and fourth wagering games 560*a,d*, the second wagering game 560*b* has also triggered the bonus game 590 due to the three BONUS symbols (two regular BONUS symbols 582*b* and one SUPER BONUS symbol 582*d*) landing in original outcome.

Unlike the other wagering games 560, the third wagering game 560*c* does not trigger the bonus game 590. This is because even with the copying of the SUPER BONUS symbol 582*d* into the outcome displayed in the matrix 566*c* of the third wagering game 560*c*, the modified outcome displayed therein contains only two triggering symbols (the SUPER BONUS symbol 582*d* in the third row, first column position and the regular BONUS symbol 582*b* in the third row, third column position). Thus, following the operation of the shared feature and copying of special symbols 582, the modified outcome displayed in the matrix 566*c* of the third wagering game 560*c* is still insufficient to trigger the bonus game 590.

Figure 19:
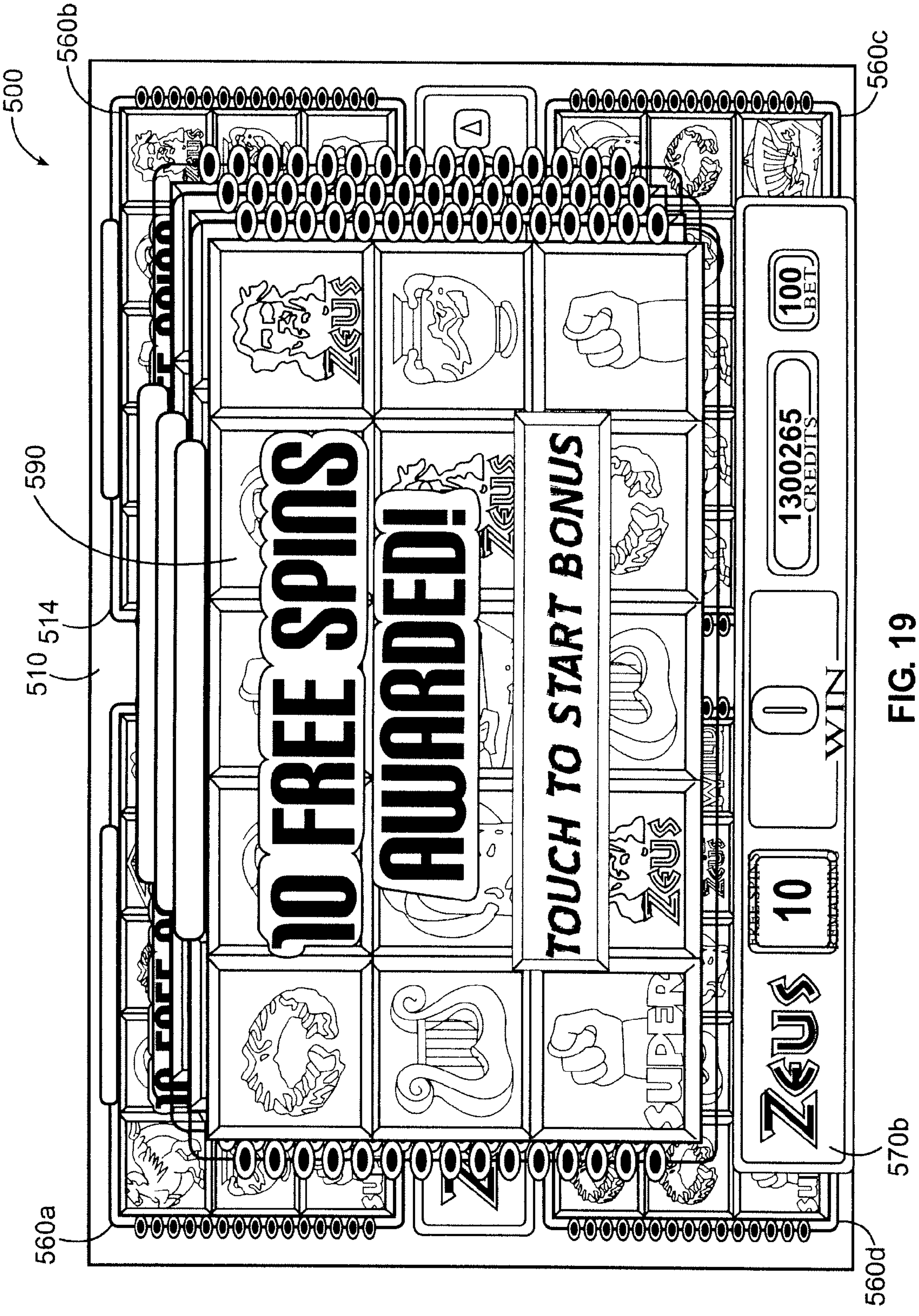
FIG. 19 is a screen shot of the bonus game of FIG. 18.

As seen in FIG. 18, because the player has triggered the bonus game 590 in three out of the four wagering games 560*a-d*, the player is prompted to select one of the three games 560*a,b,d* to commence the bonus game 590. Each of the games 560*a,b,d* indicates to the player that the bonus game 590 has been triggered ("10 Free Spins Awarded!") and prompts the player to select one of the games 560*a,b,d* to commence the bonus game 590 ("Touch to Start Bonus"). On this play of the game, the player selects the second wagering game 560*b* and touches the matrix 566*b* of the second wagering game 560*b* to commence the bonus game 590. The touched game 560*b* expands to fill the primary display 514, as seen in FIG. 19. Simultaneously, a second control bar 570*b* appears below the bonus game 590 display which overlies the underlying primary wagering games 560*a-d.*

Following the expansion, the bonus game 590 commences, plays out, and is displayed to the player. In this embodiment, the bonus game 590 comprises ten "free spins" of a slot game in which the player is awarded for winning combinations of symbols. Additionally, to compensate the player for having triggered the bonus game 590 in three out of the four primary wagering game 560*a,b,d*, the player may be provided a multiplier, credit amount, or other enhancement. For example, because three wagering games 560*a,b,d* triggered the bonus game 590, the player's total award accumulated in the bonus game 590 may be multiplied by a 3× multiplier. Alternatively, the player may be given additional free spins. For example, instead of receiving ten (10) free spins, the player may be awarded thirty (30) free spins as part of the bonus game 590. Moreover, the player may be permitted to play the bonus game 590 three times by selecting the appropriate game 560*a, b,d* that triggered the bonus game 590 in any order the player wishes. Other enhancements may be provided as well. In one embodiment, when a bonus game is triggered by multiple matrices 566, the player is prompted to select from a choice of an increased number of spins, or an increased multiplier (or other enhancement). Thus, assuming a bonus game awards ten (10) free spins, and the player triggers the bonus game in two of the matrices 566, the player may be given a choice, for example, between receiving twenty (20) spins or receiving ten (10) spins with a 2× multiplier (enhancement).

In one alternative embodiment, the special symbols may be confined to one of the four matrices and copied to the other three if a triggering event occurs. Thus, the four wagering games may comprise four matrices which may differ in configuration such that only one of the four matrices includes special symbols, or the ability to generate and display special symbols. Again, the matrices may be symbols displayed on symbol bearing reels which rotate and stop to reveal outcomes. A first matrix (one set of reels) may include special symbols. The first matrix is spun and stopped to reveal a randomly selected outcome. If a triggering event occurs, for example the appearance of one or more special symbols in the outcome displayed on the first matrix, then the special symbols in the first matrix are copied to the same position in the remaining matrices. The transferring or copying of special symbols from the first matrix to the other matrices may occur before, during or after the various matrices have been spun and stopped.

Figure 20:
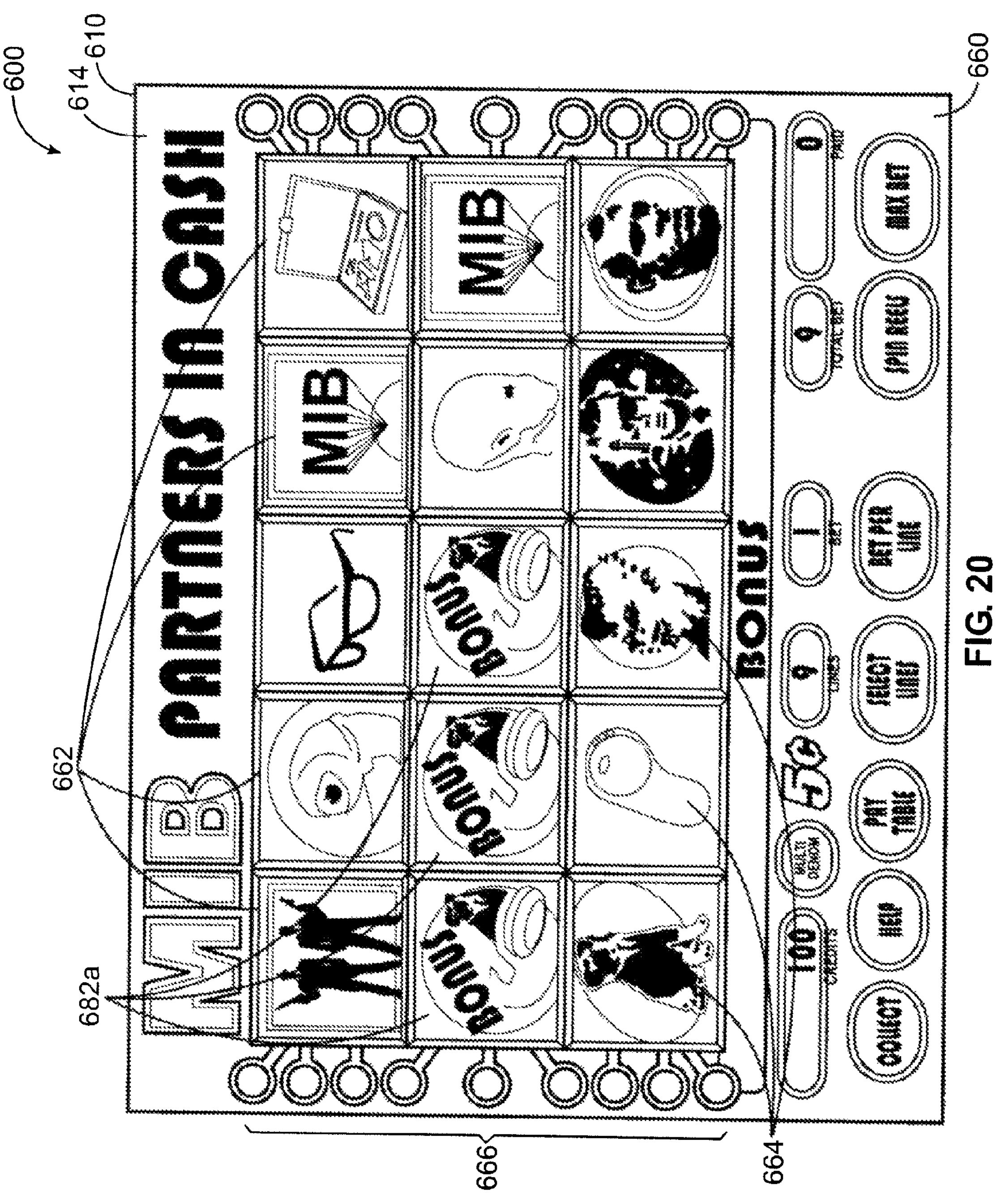
FIG. 20 is a screen shot of an alternative embodiment of a wagering game in which a bonus event is triggered.
Figure 21:
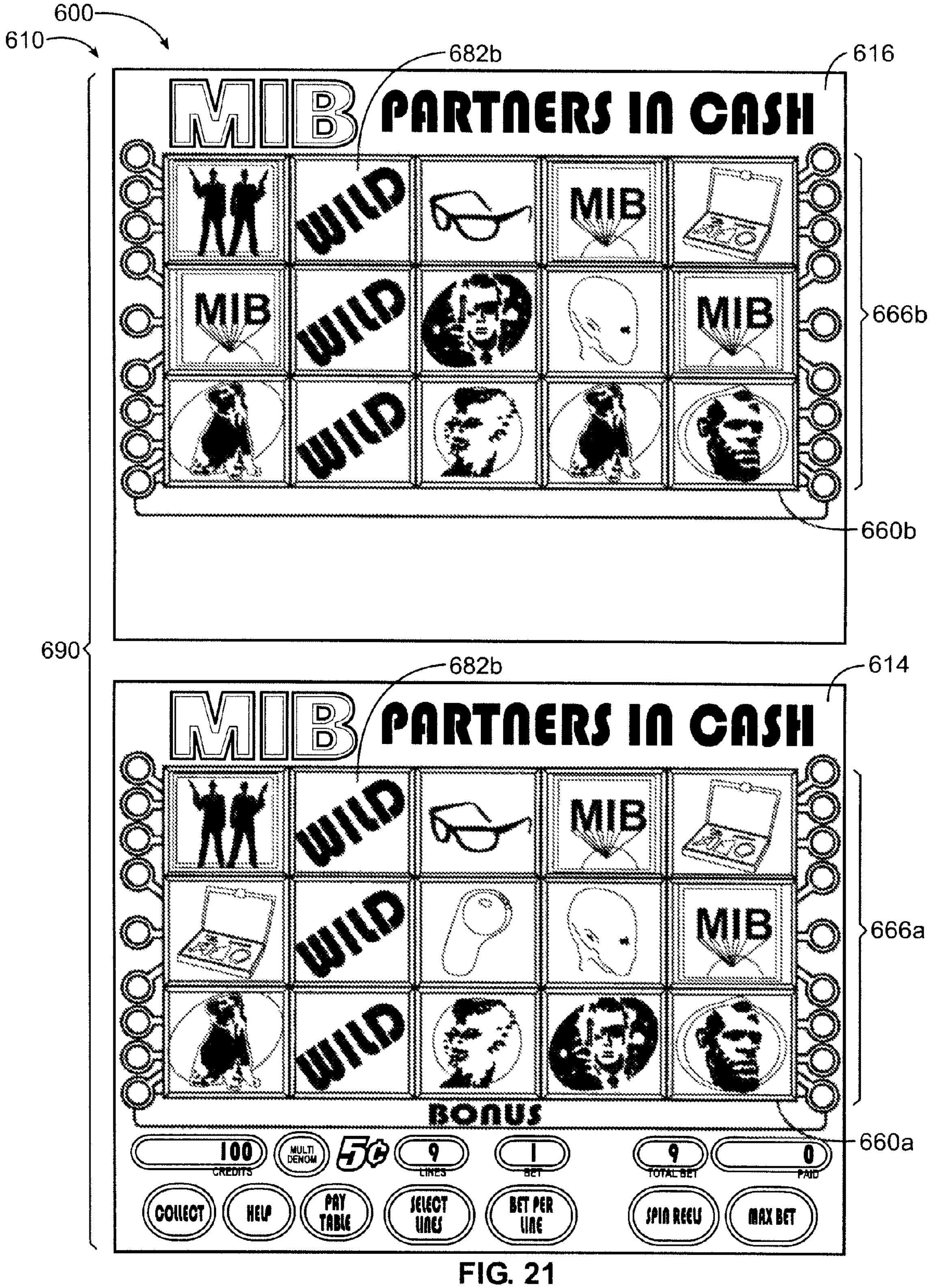
FIG. 21 is a screen shot of bonus event of FIG. 20 being activated during which a shared feature is triggered.

Turning to FIGS. 20-21, an alternative embodiment of the invention is depicted and described which includes another shared feature mechanism. In FIG. 20, a primary display 614 of a gaming device or terminal 610 of an alternative gaming system 600 is shown displaying a primary wagering game 660. The device or terminal 610 may be a freestanding gaming device as seen in FIG. 1*a*, a handheld device as seen in FIG. 1*b*, or any other device having a display 614. In this embodiment, the primary wagering game 660 is a slot game which comprises a plurality of symbol bearing reels 662 which are varied (i.e., spun and stopped) to reveal combinations of symbols 664 which are evaluated for winning combinations. The symbols 664 may include any variety of graphical symbols, elements, or representations, including symbols 664 which are associated with one or more themes of the gaming terminal 610 or system 600. The symbols 664 may also include a blank symbol or empty space. As described herein, the symbols 664 landing on active paylines 632 with each primary wagering game 660 (the paylines 632 for which a wager has been received) are evaluated for winning combinations. If a winning combination of symbols 664 lands on an active payline 632, a primary award is awarded in accordance with one or more pay tables of the gaming device 610. In primary wagering game 660, the symbols 664 on the reels 662 form an array 666 or matrix of symbols 664, having a number of rows and columns, which in the embodiment shown is three rows and five columns. In alternate embodiments, the array 666 may have greater or fewer symbols 664, and may take on a variety of different forms having greater or fewer rows and/or columns. The array 666 may even comprise other non-rectangular forms or arrangements of symbols 664.

In the embodiment shown in FIG. 20, a bonus game may be triggered by the occurrence of a triggering event, which in this embodiment is the occurrence of three or more BONUS symbols 682*a* in an outcome of the wagering game 660 landing on an activated payline 632. In FIG. 20, the requisite triggering event has occurred as seen by the three BONUS symbols 682*a* aligned in the second row of the matrix 666. As a result, a bonus game 690 is triggered and displayed in FIG. 21. In FIG. 21, the bonus game 690 is shown, which comprises simultaneously display of slot games 660*a,b* on the primary display 614 and a secondary display 616 (for example a second display 616 mounted above the primary display 614 of the gaming terminal 610, such as the displays described in reference to FIGS. 1*a* and 1*b*). The bonus game 690 comprises a free spin game in which the player is awarded a number of free spins of the slot games 660*a,b*, which in this embodiment is ten (10) free spins. During the execution of the free spins on the slot games 660*a,b* comprising the bonus game 690, certain special symbols 682 are copied from the matrix 666*a,b* of one game 660*a,b* to the other matrix 666*a,b* of the other game 660*a,b*.

For example, as seen in FIG. 21, an EXPANDING WILD special symbol 682*b* which has occurred in the second column of the first matrix 666*a* is copied, or "expands" vertically, so as to appear and occupy the second column of the second matrix 666*b*. Thus, the shared feature is triggered by certain special symbols 682 occurring in one of the matrices 666 and being copied to the other of the matrices 666*a,b*. In an embodiment, when copied, the EXPANDING WILD 682*b* replaces other symbols 664 originally appearing in the second matrix 666*b*. During play of the ten free spins on both matrices 666*a,b* the player accumulates and receives awards for winning combinations of symbols on activated paylines 632 in both matrices 666 of both slot games 660*a,b*.

In one embodiment, both of the slot games 660*a,b* can "share" or "globally accumulate" symbols for purposes of certain triggering events. For example, a particular bonus event may be triggered by a stated number of symbols appearing anywhere in the wagering game 660 (for example three BONUS symbols appearing in the matrix 666). Thus, during the free spin bonus game 690 depicted, the two matrices 666*a,b* may share, combine or be evaluated together to achieve the required triggering criteria. Thus, if during the free spin bonus game 690 shown in FIG. 21, for example, two BONUS symbols occur in the first matrix 666*a* and one or more BONUS symbols occur in the second matrix 666*b*, the particular bonus event may be triggered (or re-triggered) since the triggering criteria is satisfied (three or more BONUS symbols) by the combined matrices 666*a,b*, even though not satisfied by either matrix 666*a,b* evaluated individually.

In addition, certain "scatter pays" may be evaluated globally as well. A scatter pay is an award which is based upon a certain number of like symbols appearing in an outcome without regard to where such symbols are positioned, and without regard to whether or not they are aligned on a payline. Thus, for example, a scatter pay may be paid for five (5) or more "Sunglass" symbols. The matrices 666*a,b* may be globally evaluated (the number of Sunglass symbols occurring in both matrices 666*a,b* added together) for purposes of evaluating whether a scatter pay award should be paid. Moreover, certain scatter pays may only be possible and capable of being awarded through global evaluation and combining accumulated symbols from both matrices 666*a,b*. For example, a twelve (12) symbol scatter pay may require that at least one symbol appear in each of the matrices 666*a,b*, but otherwise allow the symbol occurrences in both matrices 666*a,b* to be combined for global evaluation purposes. The shared feature may also "swap" certain symbols from one matrix 666*a* to another 666*b* instead of copying such symbols. Thus, a first special symbol 682*a* in the first matrix 666*a* may be exchanged for a second special symbol 682 in the second matrix 666*b* as part of the shared feature. As part of the shared feature, other alternative embodiments utilizing global evaluations may include superlines (paylines the extend across more than one matrix 666*a,b* or game 660*a,b*), special symbols, and other assets which are evaluated cumulatively across multiple matrices 666*a,b*.

Figure 22:
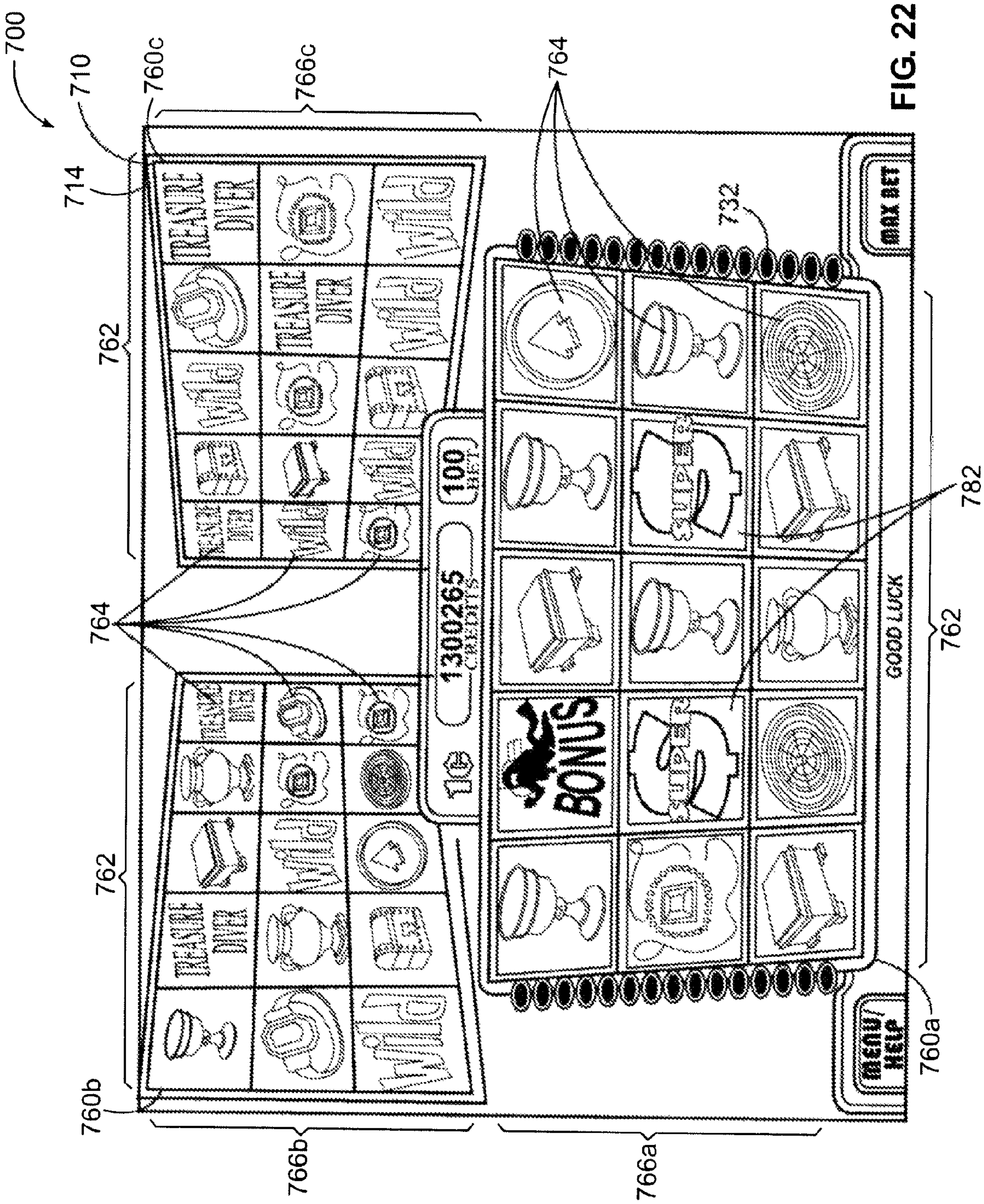
FIG. 22 is a screen shot of yet another alternative embodiment of wagering games including a shared feature in which a first eligibility criteria is met.
Figure 23:
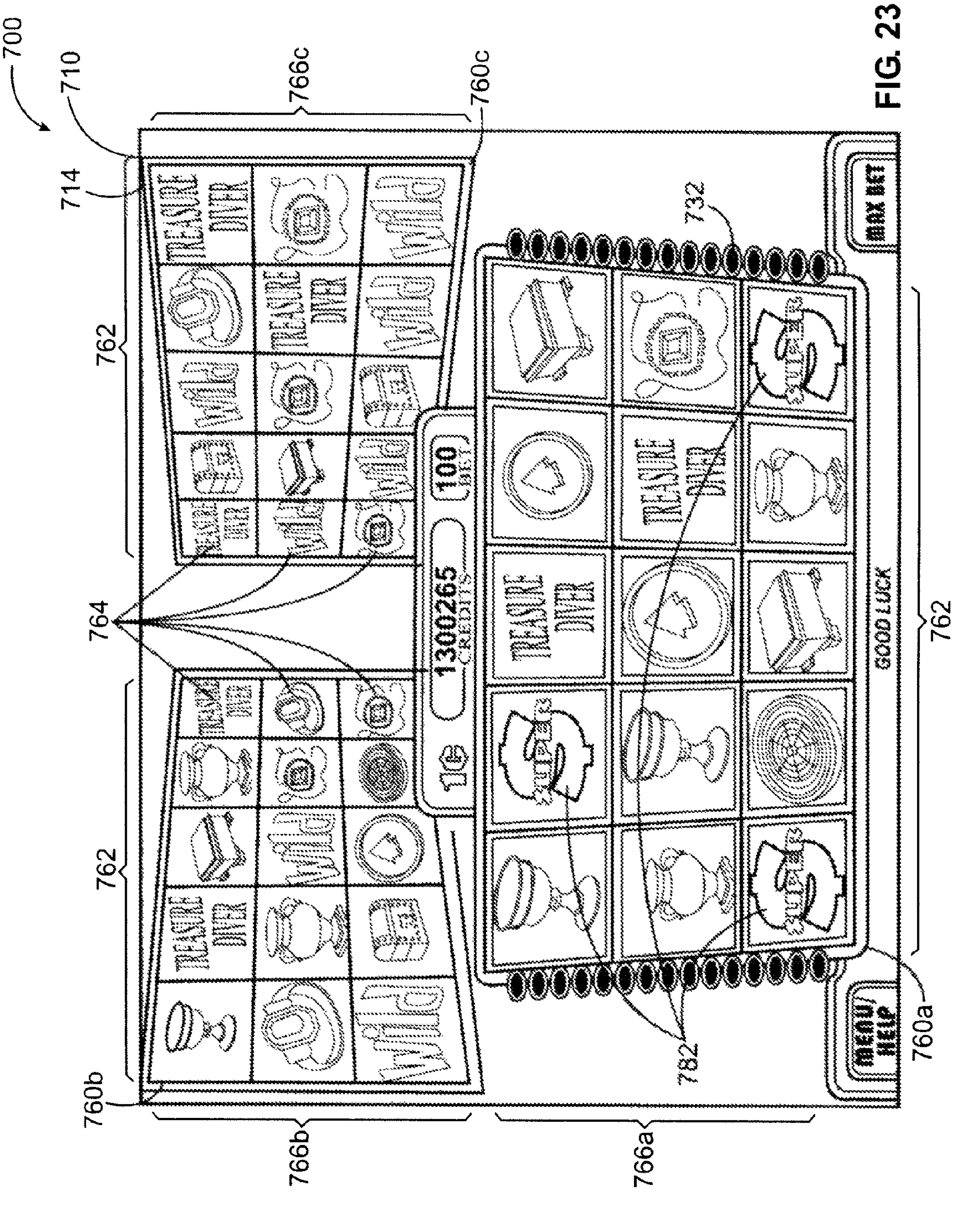
FIG. 23 is a screen shot of the wagering games of FIG. 22 in which a second eligibility criteria is met.
Figure 24:
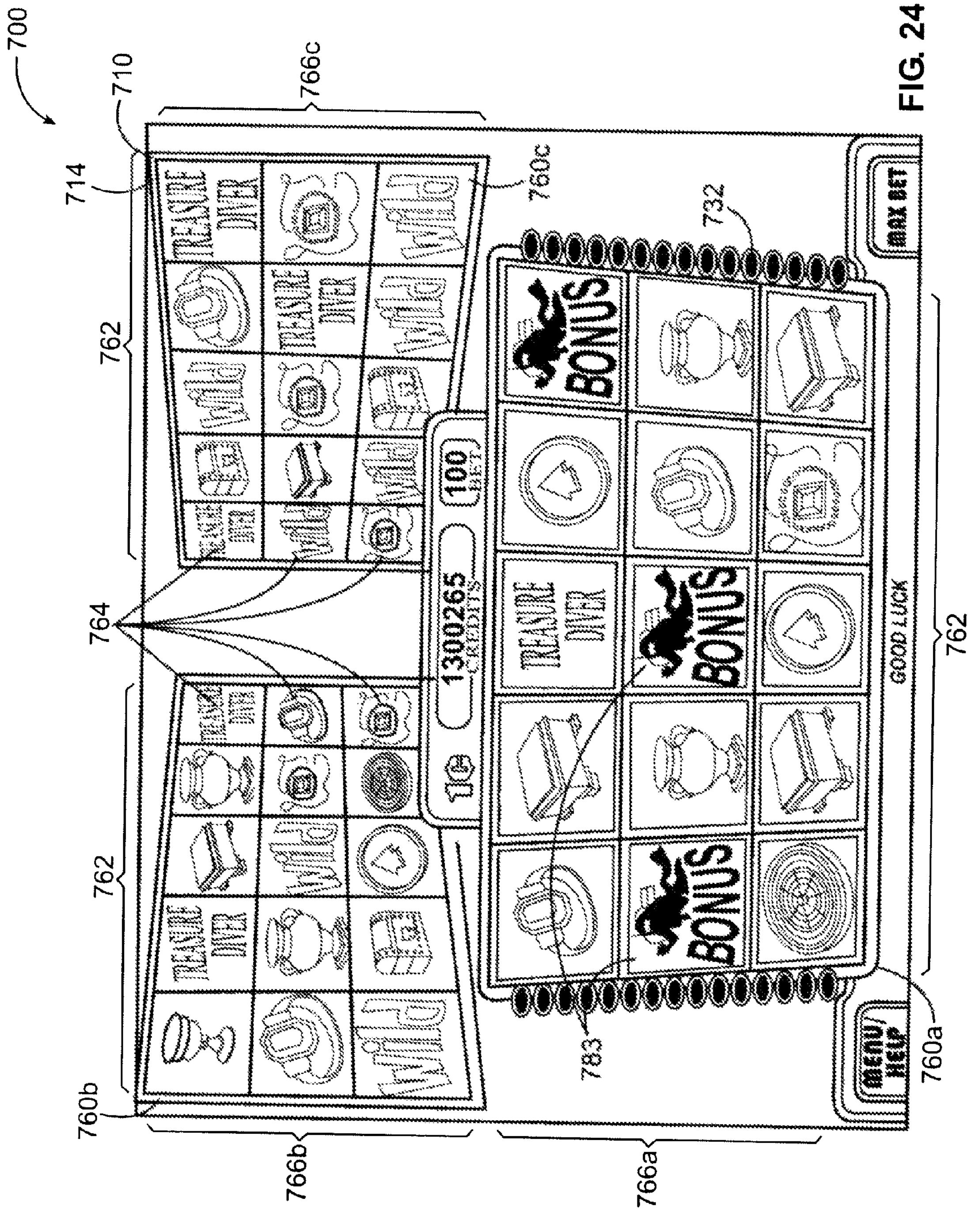
FIG. 24 is a screen shot of the wagering games of FIG. 22 in which a bonus game is triggered.

Yet another alternative embodiment of the shared features invention is displayed and described herein with reference to FIGS. 22-24. Shown in FIG. 22 is a primary display 714 of a gaming device or terminal 710 of a gaming system 700 is shown displaying a plurality of primary wagering games 760*a-d*. The device or terminal 710 may be a freestanding gaming device as seen in FIG. 1*a*, a handheld device as seen in FIG. 1*b*, or any other device having a display 714. In this embodiment, the primary wagering games 760*a-c* are slot games, each of which comprises a plurality of symbol bearing reels 762 which are varied (i.e., spun and stopped) to reveal combinations of symbols 764 which are evaluated for winning combinations. The symbols 764 may include any variety of graphical symbols, elements, or representations, including symbols 764 which are associated with one or more themes of the gaming terminal 710 or system 700. The symbols 764 may also include a blank symbol or empty space. As described herein, the symbols 764 landing on active paylines 732 with each primary wagering game 760*a-c* (the paylines 732 for which a wager has been received) are evaluated for winning combinations. If a winning combination of symbols 764 lands on an active payline 732, a primary award is awarded in accordance with one or more pay tables of the gaming device 710. In each of the primary wagering games 760*a-c*, the symbols 764 on the reels 762 form an array 766*a-c* or matrix of symbols 764, having a number of rows and columns, which in the embodiment shown is three rows and five columns. In alternate embodiments, the arrays 766*a-c* may have greater or fewer symbols 764, and may take on a variety of different forms having greater or fewer rows and/or columns. The arrays 766 may even comprise other non-rectangular forms or arrangements of symbols 764.

During play of the games 760*a-c*, a player inputs a wager into the gaming terminal 710 and initiates a play of the games 760*a-c* by an appropriate input device, for example a "spin" button. The reels 762 of all of the games 760*a-c* spin and stop to display randomly selected outcomes, which are evaluated for winning combinations associated with various awards. However, in this embodiment, the player does not automatically receive awards associated with winning combinations in all three matrixes 766*a,b,c*. Instead, the player initially receives awards for winning combinations occurring in the first matrix 766*a* of the first game 760*a*. If the combination of symbols in the first matrix 766*a* additionally includes an arrangement of symbols satisfying one or more eligibility criteria, then the player is also provided awards from the other matrices 766*b,c* as described herein. In this embodiment, the eligibility requirement to receive awards from the other matrices 766*b,c* comprises an occurrence of a predetermined number of special symbols 782 in the first matrix 766*a*.

Thus, as seen in FIG. 22, if the outcome in the first matrix 766*a* includes at least two "SUPER" symbols 782, a first eligibility criteria is satisfied and the player is awarded awards for all winning combinations in the first matrix 766*a* and for all winning combinations in the second matrix 766*b* as well. However, the player has not qualified for the wins in the third matrix 766*c*. Thus, the first two matrices 760*a,b* are shown highlighted to signify that they are active, in the sense that awards therein are being provided to the player. The third matrix 760*c* is shown as un-highlighted or deactivated to signify that awards therein will not be provided to the player. Turning to FIG. 23, if the outcome in the first matrix 766*a* includes at least three "SUPER" symbols 782, a second eligibility criteria is satisfied and the player is awarded awards for all winning combinations in all three matrices 766*a-c*. As seen in FIG. 23, all three matrices 766*a-c* are shown as highlighted to signify that they are active, in the sense that awards therein are being provided to the player. Thus, although on each play of the games 760, the player is able to view the winning combinations of symbols displayed in each matrix 766, he only receives awards for the winning combinations of symbols in the second and third matrices 766*b,c* if the eligibility criteria is met (the requisite number of triggering symbols appears in the first matrix 766*a*).

In one embodiment, a payout or payback percentage associated with the first game 760*a* is relatively low, on the order of 30% EV (expected value). The payout or payback percentage associated with the second game 760*b* may be significantly higher, for example on the order of 90%. Moreover, a payout or payback percentage associated with the third game 760*c* may be even higher, and may even exceed 100%, for example being 120%. Thus, although the player will experience reduced payouts on the first game 760*a*, the periodic triggering of the awards on the second and third games 760*b,c* at much higher expected values serves to offset the lower expected value of the first game 760*a*, and creates an overall expected value or payback percentage in a desirable range, for example 90%. The games 760 may be configured so that the likelihood of triggering the awards on the second and third games 760*b,c* is periodic. For example, by incorporating a given number of triggering "SUPER" symbols 862 in the first game 760*a*, the random generation of outcomes may be controlled so that the second game 760*b* awards are triggered, for example, every nine (9) spins on average while the third game 760*c* awards are triggered, for example, every sixty (60) spins on average. The mathematics of the configurations may be manipulated so that the game has an expected value, payback percentage, and other operating characteristics which are desirable for both an operator and player of the game. One way in which the second and third matrices 760*b,c* may configured to have a higher payback percentage is to have included therein a higher proportion of special symbols (such as WILD symbols, multipliers, expanding wilds, etc.) to increase awards. Other configuration adjustments are possible as well.

In FIG. 24 is shown a bonus game 790 which may be triggered during play of the first wagering game 760. The bonus game 790 comprises a free spin slot game in which the player is awarded a series of free spins (for example ten free spins) of the reels of all three matrices 766*a,b,c*, and is provided all awards collected therein. The bonus game is triggered in response to three or more BONUS symbols 782*a* appearing in the outcome displayed on the reels of the first matrix 766*a* of the first wagering game 760*a*. Once triggered, the bonus game 790 comprises three reels of all three matrices 766*a,b,c* spinning and stopping to reveal outcomes which are evaluated for winning combinations, and associated awards are paid to the player. The bonus game 790 may utilize the same symbols as the primary wagering games 760*a,b,c* or may utilize special symbols or special arrangements of symbols. For example, the bonus game 790 may include a higher proportion of special symbols (such as WILD symbols, multipliers, expanding wilds, etc.) to increase awards therein during the free spins.

In one alternative embodiment, the plurality of matrices displaying a plurality of wagering games may be used to create and display a bonus enhancement. For example, the plurality of wagering games may comprise identical copies of the same game wherein the reels spin and stop in unison to display multiple occurrences (copies) of the same outcome. However, upon the occurrence of a triggering event, portions of the outcomes in each matrix may be held or "frozen" while the remaining symbols in the outcome are varied again, or spun. For example, if a bonus game requires three BONUS symbols appearing in the matrix to be triggered, and if in the initiating outcome, two or more BONUS symbols appear, then the reels on which the BONUS symbols appear may be frozen while the remaining reels are re-spun. When the remaining reels in each game are re-spun however, each game's reels may be re-spun independently of one another to increase the chances that a third or qualifying BONUS symbol appears on the re-spin and the BONUS is triggered. Thus, in one example, a player makes a wager and presses a spin button, and observes ten (10) identical wagering games spin and stop in unison to display ten instances of an initial outcome. If the initial outcome satisfies a re-spin triggering criteria, a portion of the initial outcome is held or frozen, while a remainder of the outcome is re-spun, wherein each of the ten matrices re-spins independently of one another. Suppose that in the initial outcome, a Bonus symbol appears on the first and second reels (out of five reels). On the re-spin, the remaining reels (third, fourth and fifth reels) for each matrix and wagering game would re-spin independently to display a randomly selected revised outcome on the remaining three reels. This provides the player an increased likelihood of triggering the bonus in at least one of the games. In one embodiment, the player may get an enhancement such as a multiplier, for each of the matrices which triggers the bonus by displaying a third BONUS symbol after the re-spin. Thus, if four out of the ten matrices trigger the bonus game on the re-spin, the player enters the bonus game with a 4× multiplier. Other enhancement may be given to the player as well.

In another alternative embodiment, the plurality of matrices displaying a plurality of wagering games may be used to create and display a spinning streak feature. For example, in the embodiment of ten matrices described above, alternative criteria for re-spinning reels may be continued improvement or addition of winning combinations. Suppose that the reels in all ten matrices spin and stop to display ten instances of an initial outcome which is evaluated. As before, all ten matrices are identical and spin and stop to display the same outcome (copies of one another). If the initial outcome satisfies re-spin triggering criteria, a portion or subset of the initial outcome is held or frozen, while a remainder of the outcome is re-spun, wherein each of the ten matrices re-spins independently of one another. On the first re-spin, if at least one of the matrices results in an improvement (an additional or higher paying winning combination in the modified outcome of symbols), then yet another re-spin is triggered. In one embodiment, if any of the ten matrices improves, then all ten of the matrices are provided with a supplemental re-spin. In another embodiment, only those matrices which improve receive another re-spin while the matrices that do not improve are held to display a final outcome. The re-spinning may be allowed to continue repeatedly until all of the matrices fail to improve and reach a final outcome. The final outcome on each matrix is evaluated and attendant awards are paid to the player.

In yet another alternative embodiment, the plurality of matrices displaying a plurality of wagering games may be used to create and display a reel enhancement feature. Using the same example of ten matrices (ten wagering games), the reels may be configured such that the first three reels include standard symbols which are evaluated for winning combinations on activated paylines, while the fourth and fifth reels contain enhancements such as multipliers and/or credit amounts. If the first three reels spin and stop to reveal a winning combination, an associated award is paid to the player. Additionally, the fourth reels spins and stops to possibly reveal a first enhancement, such as a first multiplier. The fourth reel may also stop to reveal no additional enhancement. If the fourth reel awards a first enhancement (such as a 3× multiplier), the fifth reel is activated which spins and stops to possible reveal a second enhancement, such as a second multiplier. The fifth reel may also stop to reveal no additional enhancement. If the fifth reel awards a second enhancement (such as 5× multiplier), then the players initial award is modified by both the first and second enhancement. In one embodiment, the first and second enhancements may be added together (total of 8× multiplier), or alternatively, the first and second enhancements may be multiplied together (total of 15× multiplier).

Utilizing the plurality of matrices as described herein, the feature may be even further expanded by making the first three reels on each matrix copies of one another, while the fourth and fifth reels spin independently to produce varying random outcomes with respect to enhancements. Thus, for example, a player inserts a wager and executes a play of the game. The reels in each of the ten matrices spin and stop to display the same randomly selected outcome (copies of one another). Suppose that the initial outcome generated includes three like symbols aligned on an activated payline for which an award of 500 credits is paid. The three like symbols are held in each of the matrices, while the fourth and fifth reels (bearing enhancements) are spun and stopped to reveal independently generated randomly selected outcomes. For example, in a first matrix, the fourth and fifth reels may produce a total 4× multiplier while in a second matrix the fourth and fifth reels produce a total 10× multiplier and in a third matrix the fourth and fifth reels produce no enhancement. The player would be paid 2000 credits in the first game, 5000 credits in the second game and 500 credits (no enhancement) in the third game.

In yet another embodiment, mystery triggered upgrades and enhancements may be randomly distributed amongst a plurality of matrices of the plurality of primary wagering games. Thus, for example, a mystery triggered event may comprise providing a plurality of WILD symbols to be used in the games. The feature may randomly decide which matrices receive WILD symbols and where within those matrices the WILD symbols are positioned. Suppose ten WILD symbols are provided which are distributed to symbol positions within the games. Given the random nature of the feature, it is possible for all ten of the WILD symbols to land in one game's matrix, or alternatively, the WILD symbols may land in a plurality of the matrices across a plurality of games. Thus, one matrix may get three WILD symbols, while another gets five WILD symbols, while other matrices get no WILD symbols. Other enhancements may be provided in such a randomly distributed fashion as well, such as multipliers, WILD reels, expanding WILD symbols, BONUS symbols, etc. The enhancements may further be distributed with colorful and entertaining animation, sound, and graphics to emphasize their being awarded.

It should be understood that the plurality of matrices comprising the plurality of wagering games, as described herein, may be displayed on the same display, or on a plurality of displays. For example, a plurality of matrices may all be displayed on a single display, such as an LCD screen of the gaming terminal. Alternatively, one or more matrices may be displayed on a first display while one or more matrices is displayed on a second display, such as a top box display of a gaming terminal, a community or shared display, a display on a handheld device, such as a handheld gaming terminal, mobile phone, a PDA, or other personal electronic device. Thus, the features implemented in accordance with the present invention may be executed on any number of displays which have been configured to act in concert with one another.

Moreover, it should be understood that a variety of triggering events may be used to trigger the symbol copying, enhancement distribution, symbol swapping, and other functions of the shared features described herein. The triggering event may be a mystery trigger such that it is not readily apparent to the player why the shared feature was triggered. Alternatively, the triggering event may be a symbol based triggered which is dependent on the nature and arrangement of symbols in one or more outcomes within the wagering games, as described in some of the example embodiments herein. Other triggering events may be used as well, including time base triggers, random selection, advancement to certain levels or episodes, collection of certain assets, time on device, accumulation of certain credits, etc.

The system and methods of the present invention offer substantial benefits to players and operators alike. By displaying a plurality of matrices and wagering games, players experience additional excitement and a perceived increase in likelihood of winning. Moreover, the shared features described herein further induce excitement and anticipation by rewarding players with greater opportunities to increase their wins, improve outcomes, and trigger bonus and other events. Other benefits are provided as well.

Each of these embodiments and obvious variations thereof is contemplated as falling within the spirit and scope of the claimed invention, which is set forth in the following claims.

What is claimed is:

1. A method of playing a wagering game on a gaming system with at least one input device, at least one display, and at least one processor, the method comprising:

receiving an indication of a wager via the at least one input device;

generating, via the at least one processor, a randomly selected first outcome of a first wagering game, the first wagering game including a first plurality of symbol bearing reels, and the first outcome comprising a first plurality of symbols of the first plurality of symbol bearing reels arranged in a first matrix;

generating, via the at least one processor, a randomly selected second outcome of a second wagering game, the second wagering game including a second plurality of symbol bearing reels, and the second outcome comprising a second plurality of symbols of the second plurality of symbol bearing reels arranged in a second matrix distinct from the first matrix;

displaying the first and second pluralities of symbol bearing reels spinning;

simultaneously displaying the first outcome and the second outcome on the at least one display;

in response to an occurrence of a triggering event and while at least one of the second plurality of symbol bearing reels is displayed spinning, copying a first special symbol occurring in the first outcome into the second outcome to yield a modified second outcome; and evaluating the first outcome and the modified second outcome for winning combinations of symbols.

2. The method of claim 1, wherein the first special symbol replaces a first standard symbol occurring in the second outcome.

3. The method of claim 2, wherein the first standard symbol is included in a group of standard symbols for which winning combinations are paid in accordance with a pay table associated with the first and second wagering games.

4. The method of claim 3, wherein the first special symbol is selected from the group consisting of a WILD symbol, a BONUS symbol, an expanding WILD symbol, a multiplying WILD symbol, a SUPER WILD symbol, a SUPER BONUS symbol, a CLUMPED symbol and a SUPER CLUMPED symbol.

5. The method of claim 1, wherein the triggering event comprises the occurrence of the first special symbol in the first outcome.

6. The method of claim 1, wherein the first special symbol replaces a first standard symbol occurring in the second outcome, and wherein the first special symbol occupies a position in the first matrix which is the same as a position in the second matrix occupied by the first standard symbol.

7. The method of claim 1, further comprising, in response to the triggering event, copying a second special symbol occurring in the second outcome into the first outcome to yield a modified first outcome.

8. The method of claim 1, wherein the first special symbol is part of a clump of special symbols and, in response to the occurrence of the triggering event, the clump of special symbols is copied to the at least one of the second plurality of symbol bearing reels while still spinning.

9. The method of claim 1, further comprising, in response to a second triggering event and while at least another one of the second plurality of symbol bearing reels is displayed spinning, copying a second special symbol occurring in the first outcome into the second outcome to yield the modified second outcome.

10. The method of claim 9, wherein the first special symbol is copied to the at least one of the second plurality of symbol bearing reels while still spinning, and the second special symbol is copied to the at least another one of the second plurality of symbol bearing reels while still spinning.

11. The method of claim 1, further comprising:

generating a randomly selected third outcome of a third wagering game, the third wagering game including a third plurality of symbol bearing reels, and the third outcome comprising a third plurality of symbols of the third plurality of symbol bearing reels arranged in a third matrix distinct from the first and second matrices;

displaying the third plurality of symbol bearing reels spinning;

simultaneously displaying the third outcome with the first and second outcomes;

in response to the triggering event and while at least one of the third plurality of symbol bearing reels is displayed spinning, copying the first special symbol occurring in the first outcome into the third outcome to yield a modified third outcome; and evaluating the modified third outcome for winning combinations of symbols.

12. A gaming system comprising:

at least one input device;

at least one display; and at least one controller operative to:

generate a randomly selected first outcome of a first wagering game, the first wagering game including a first plurality of symbol bearing reels, and the first outcome comprising a first plurality of symbols of the first plurality of symbol bearing reels arranged in a first matrix;

generate a randomly selected second outcome of a second wagering game, the second wagering game including a second plurality of symbol bearing reels, and the second outcome comprising a second plurality of symbols of the second plurality of symbol bearing reels arranged in a second matrix different from the first matrix;

cause the at least one display to display the first and second pluralities of symbol bearing reels spinning;

cause the at least one display to simultaneously display the first outcome and the second outcome;

in response to an occurrence of a triggering event and while at least one of the second plurality of symbol bearing reels is displayed spinning, copy a first special symbol occurring in the first outcome into the second outcome to yield a modified second outcome; and evaluate the first outcome and the modified second outcome for winning combinations of symbols.

13. The gaming system of claim 12, wherein the first special symbol replaces a first standard symbol occurring in the second outcome.

14. The gaming system of claim 13, wherein the first special symbol occupies a position in the first matrix which is the same as a position in the second matrix occupied by the first standard symbol.

15. The gaming system of claim 13, wherein the first standard symbol is included in a group of standard symbols for which winning combinations are paid in accordance with a pay table associated with the first and second wagering games.

16. The gaming system of claim 12, wherein the first special symbol is selected from the group consisting of a WILD symbol, a BONUS symbol, an expanding WILD symbol, a multiplying WILD symbol, a SUPER WILD symbol, a SUPER BONUS symbol, a CLUMPED symbol and a SUPER CLUMPED symbol.

17. The gaming system of claim 12, wherein the at least one controller is further operative to, in response to the triggering event, copy a second special symbol occurring in the second outcome into the first outcome to yield a modified first outcome.

18. The system of claim 12, wherein the first special symbol is part of a special symbol clump and, in response to the triggering event, the special symbol clump is copied into the second outcome to yield the modified second outcome.

19. A method of playing a wagering game on a gaming system with at least one input device, at least one display, and at least one processor, the method comprising:

receiving an indication of a wager via the at least one input device;

generating, via the at least one processor, a plurality of randomly selected outcomes in a plurality of wagering games, each of the wagering games including a respective plurality of symbol bearing reels, and each of the wagering game outcomes comprising a respective plurality of symbols arranged in a respective matrix;

displaying the symbol bearing reels of the plurality of wagering games spinning;

simultaneously displaying the plurality of randomly selected outcomes on the at least one display;

in response to a triggering event and while at least some of the symbol bearing reels of the plurality of wagering games are displayed spinning, copying a first special symbol occurring in the outcome of a first one of the matrices into each outcome of a remainder of the plurality of matrices, wherein the first special symbol replaces one or more standard symbols occurring in the outcomes of the remainder of the plurality of matrices; and evaluating the outcome of the first one of the matrices and the modified outcomes of the remainder of the plurality of matrices for winning combinations of symbols.

20. The method of claim 19, wherein the triggering event comprises at least one occurrence of the first special symbol in the plurality of matrices.

21. A method of playing a wagering game on a gaming system with at least one input device, at least one display, and at least one processor, the method comprising:

receiving an indication of a wager via the at least one input device;

generating, via the at least one processor, a randomly selected first outcome of a first wagering game, the first wagering game including a first plurality of symbol bearing reels, and the first outcome comprising a first plurality of symbols of the first plurality of symbol bearing reels arranged in a first matrix;

generating, via the at least one processor, a randomly selected second outcome of a second wagering game, the second wagering game including a second plurality of symbol bearing reels, and the second outcome comprising a second plurality of symbols of the second plurality of symbol bearing reels arranged in a second matrix distinct from the first matrix;

displaying the first and second pluralities of symbol bearing reels spinning;

simultaneously displaying the first outcome and the second outcome on the at least one display;

awarding a first award for a winning combination of symbols included in the first outcome;

in response to a triggering event in the first outcome of the first wagering game, copying a first special symbol occurring in the first outcome onto a spinning one of the second plurality of symbol bearing reels to generate a modified second outcome;

evaluating a first eligibility criteria for the player to receive a second award for a winning combination of symbols included in the modified second outcome; and if the eligibility criteria is satisfied, awarding the second award to the player.

22. The method of claim 21, further comprising:

generating a randomly selected third outcome of a third wagering game, the third outcome comprising a third plurality of symbols arranged in a third matrix;

simultaneously displaying the third outcome with the first and second outcomes on the at least one display; and evaluating a second eligibility criteria for the player to receive a third award for a winning combination of symbols included in the third outcome, and if the eligibility criteria is satisfied, awarding the third award to the player.

23. The method of claim 22, wherein the first eligibility criteria comprises a first predetermined number of occurrences of a first special symbol in the first outcome.

24. The method of claim 23, wherein the second eligibility criteria comprises a second predetermined number of occurrences of the first special symbol in the first outcome.

25. The method of claim 21, wherein the first wagering game is associated with a first payback percentage and the second wagering game is associated with a second payback percentage different from the first payback percentage.

* * * * *